(12) United States Patent
Tseng

(10) Patent No.: US 9,936,243 B2
(45) Date of Patent: *Apr. 3, 2018

(54) AGGREGATING LIKES TO A MAIN PAGE

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,391

(22) Filed: Aug. 24, 2016

(65) Prior Publication Data
US 2017/0054675 A1     Feb. 23, 2017

Related U.S. Application Data

(63) Continuation of application No. 14/074,915, filed on Nov. 8, 2013, now Pat. No. 9,455,945.
(Continued)

(51) Int. Cl.
*G06F 15/16* (2006.01)
*H04N 21/422* (2011.01)
(Continued)

(52) U.S. Cl.
CPC ....... *H04N 21/4221* (2013.01); *G06F 3/0482* (2013.01); *G06F 3/04817* (2013.01);
(Continued)

(58) Field of Classification Search
CPC .............. G06F 3/04817; G06F 3/0482; G06F 3/04883; G06F 3/04886; G06F 17/30029; G06F 17/3005; G06F 17/30867; G06Q 50/01; H04L 51/32; H04L 67/02; H04L 67/306; H04N 21/252; H04N 21/26291; H04N 21/4221; H04N 21/462;
(Continued)

(56) References Cited

U.S. PATENT DOCUMENTS 7,882,528 B1    2/2011    Taylor
8,442,265 B1 *  5/2013    Bosworth ........... G06F 17/3079
                                                        382/100
(Continued)

OTHER PUBLICATIONS

U.S. Appl. No. 15/393,531, filed Dec. 29, 2016, Tseng.
(Continued)

*Primary Examiner* — Moustafa A Meky
*Assistant Examiner* — Thorne E Waugh
(74) *Attorney, Agent, or Firm* — Baker Botts L.L.P.

(57) ABSTRACT

In one embodiment, a method includes accessing a social graph of a social-networking system, and determining, from the social graph, that a user "likes" a first page associated with a particular version of a media content. The social graph includes a plurality of nodes and edges connecting the nodes. The nodes include user nodes that are each associated with a particular user of the social-networking system. The method further includes determining that one or more other versions of the media content exist, determining that a main page is associated with the particular version and the one or more other versions of the media content, and aggregating the user's "like" of the first page to the main page. Each of the one or more other versions of the media content has one or more associated pages.

17 Claims, 26 Drawing Sheets

Related U.S. Application Data

(60) Provisional application No. 61/768,303, filed on Feb. 22, 2013.

(51) Int. Cl.

| | | |
|---|---|---|
| *H04N 21/262* | (2011.01) | |
| *H04L 12/58* | (2006.01) | |
| *H04L 29/08* | (2006.01) | |
| *G06F 3/0482* | (2013.01) | |
| *H04N 21/462* | (2011.01) | |
| *H04N 21/4788* | (2011.01) | |
| *H04N 21/482* | (2011.01) | |
| *G06F 3/0488* | (2013.01) | |
| *G06F 3/0481* | (2013.01) | |
| *G06Q 50/00* | (2012.01) | |
| *H04N 21/25* | (2011.01) | |
| *H04N 21/475* | (2011.01) | |
| *G06F 17/30* | (2006.01) | |
| *H04N 21/431* | (2011.01) | |
| *H04N 21/466* | (2011.01) | |

(52) U.S. Cl.
CPC ...... *G06F 3/04883* (2013.01); *G06F 3/04886* (2013.01); *G06F 17/3005* (2013.01); *G06F 17/30029* (2013.01); *G06F 17/30867* (2013.01); *G06Q 50/01* (2013.01); *H04L 51/32* (2013.01); *H04L 67/02* (2013.01); *H04L 67/306* (2013.01); *H04N 21/252* (2013.01); *H04N 21/26291* (2013.01); *H04N 21/4312* (2013.01); *H04N 21/462* (2013.01); *H04N 21/4668* (2013.01); *H04N 21/4756* (2013.01); *H04N 21/4788* (2013.01); *H04N 21/482* (2013.01); *H04N 21/4821* (2013.01); *H04N 21/4826* (2013.01)

(58) Field of Classification Search
CPC ........... H04N 21/4766; H04N 21/4788; H04N 21/482; H04N 21/422
USPC ................................................ 709/203–248
See application file for complete search history.

(56) References Cited

U.S. PATENT DOCUMENTS

| | | | |
|---|---|---|---|
| 8,528,022 B1 | 9/2013 | Schwartz | |
| 8,533,236 B1 | 9/2013 | Baluja et al. | |
| 8,555,177 B1 | 10/2013 | Junee | |
| 8,762,413 B2* | 6/2014 | Graham, Jr. ...... | G06F 17/30038 707/790 |
| 8,856,141 B1 | 10/2014 | Dean | |
| 8,892,651 B1* | 11/2014 | Goldman ............... | G06Q 50/01 705/319 |
| 9,455,945 B2 | 9/2016 | Tseng | |
| 9,600,806 B2* | 3/2017 | Baggett ................ | G06Q 10/107 |
| 2001/0027562 A1 | 10/2001 | Schein | |
| 2003/0216861 A1 | 11/2003 | Sakata | |
| 2005/0138656 A1 | 6/2005 | Moore et al. | |
| 2006/0101498 A1 | 5/2006 | Arling | |
| 2007/0033633 A1 | 2/2007 | Andrews | |
| 2007/0157220 A1 | 7/2007 | Cordray | |
| 2009/0025025 A1 | 1/2009 | Vleck | |
| 2009/0100096 A1* | 4/2009 | Erlichson ............... | H04L 67/02 |
| 2009/0167855 A1 | 7/2009 | Kummer | |
| 2009/0199080 A1 | 8/2009 | Fox | |
| 2009/0293079 A1 | 11/2009 | McKee | |
| 2010/0083310 A1 | 4/2010 | VanDuyn | |
| 2010/0146042 A1 | 6/2010 | Kruhoeffer | |
| 2010/0185507 A1 | 7/2010 | Tokuda | |
| 2010/0192180 A1 | 7/2010 | Olague | |
| 2010/0194998 A1 | 8/2010 | Lee | |
| 2010/0205628 A1 | 8/2010 | Davis | |
| 2010/0241699 A1 | 9/2010 | Muthukumarasamy | |
| 2010/0306708 A1 | 12/2010 | Trenz et al. | |
| 2010/0306801 A1 | 12/2010 | Filippov | |
| 2011/0137902 A1 | 6/2011 | Wable | |
| 2011/0202603 A1 | 8/2011 | Mate | |
| 2011/0283304 A1 | 11/2011 | Roberts | |
| 2011/0288912 A1 | 11/2011 | McCrea | |
| 2011/0320380 A1 | 12/2011 | Zahn | |
| 2012/0005224 A1 | 1/2012 | Ahrens | |
| 2012/0147022 A1 | 6/2012 | Roberts | |
| 2012/0174157 A1 | 7/2012 | Stinson, III | |
| 2012/0278725 A1 | 11/2012 | Gordon | |
| 2012/0290399 A1 | 11/2012 | England | |
| 2012/0303710 A1 | 11/2012 | Roberts et al. | |
| 2012/0331496 A1 | 12/2012 | Copertino | |
| 2013/0018960 A1 | 1/2013 | Knysz | |
| 2013/0073400 A1 | 3/2013 | Heath | |
| 2013/0073473 A1 | 3/2013 | Heath | |
| 2013/0086185 A1 | 4/2013 | Desmarais | |
| 2013/0111510 A1 | 5/2013 | Baker | |
| 2013/0138644 A1 | 5/2013 | Yahia | |
| 2013/0176256 A1 | 7/2013 | Hara | |
| 2013/0290444 A1 | 10/2013 | Billings | |
| 2014/0052534 A1 | 2/2014 | Gandhi | |
| 2014/0067828 A1 | 3/2014 | Archibong | |
| 2014/0067961 A1 | 3/2014 | Archibong | |
| 2014/0108604 A1 | 4/2014 | Jung | |
| 2014/0130092 A1 | 5/2014 | Kunisetty | |
| 2014/0164506 A1 | 6/2014 | Tesch | |
| 2014/0196064 A1 | 7/2014 | Kennedy | |
| 2014/0244751 A1 | 8/2014 | Tseng | |
| 2014/0244752 A1 | 8/2014 | Tseng | |
| 2014/0244753 A1 | 8/2014 | Tseng | |
| 2014/0245186 A1 | 8/2014 | Tseng | |
| 2014/0245187 A1 | 8/2014 | Tseng | |
| 2014/0245352 A1 | 8/2014 | Tseng | |
| 2017/0111701 A1 | 4/2017 | Tseng | |

OTHER PUBLICATIONS

Smith et al., Analyzing (Social Media) Networks with NodeXL, C&T '09, Jun. 25-27, 2009, University Park, Pennsylvania, USA, ACM 978-1-60558-601-4/09/06, pp. 255-258, Apr. 9, 2006.

Qi, et al., Community Detection with Edge Content in Social Media Networks, Department of Electrical and Computer Engineering, University of Illinois at Urbana-Champaign, 1084-4627/12 $26.00 © 2012 IEEE, DOI 10.1109/ICDE.2012.77, pp. 534-545.

U.S. Appl. No. 15/596,597, filed May 16, 2017, Tseng.

* cited by examiner

AGGREGATING LIKES TO A MAIN PAGE

RELATED APPLICATIONS

This application is a continuation of U.S. patent application Ser. No. 14/074,915 entitled "Aggregating Likes to a Main Page," filed Nov. 8, 2013, which claims the benefit of U.S. Provisional Application No. 61/768,303 entitled "Sharing Television and Video Programming through Social Networking," by Erick Tseng et al., filed Feb. 22, 2013.

TECHNICAL FIELD

This disclosure relates generally to social networking.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments may enhance a user's television viewing experience by providing an application ("app") to view recommended media content and to select what to watch on the user's TV. The app may run on any computing device such as a smartphone and provides recommendations for media content that are based on social actions on a social network. The app interfaces with the user's set-top box ("STB"), multi-system operators ("MSOs"), and a social-networking system. Some embodiments of the app interface with a dongle of the social-networking system.

The app may determine that a user "likes" a page associated with a particular version of media content using a social graph in an embodiment. The app may determine that other versions of the media content exist and that there are other pages associated with those versions. The app may determine that a main page is associated with all of the versions of the media content and aggregate the user's "like" of the page to the main page. In some embodiments, the app may remove all of the user's other "likes" of the other pages.

DESCRIPTION OF EXAMPLE EMBODIMENTS

Figure 1:
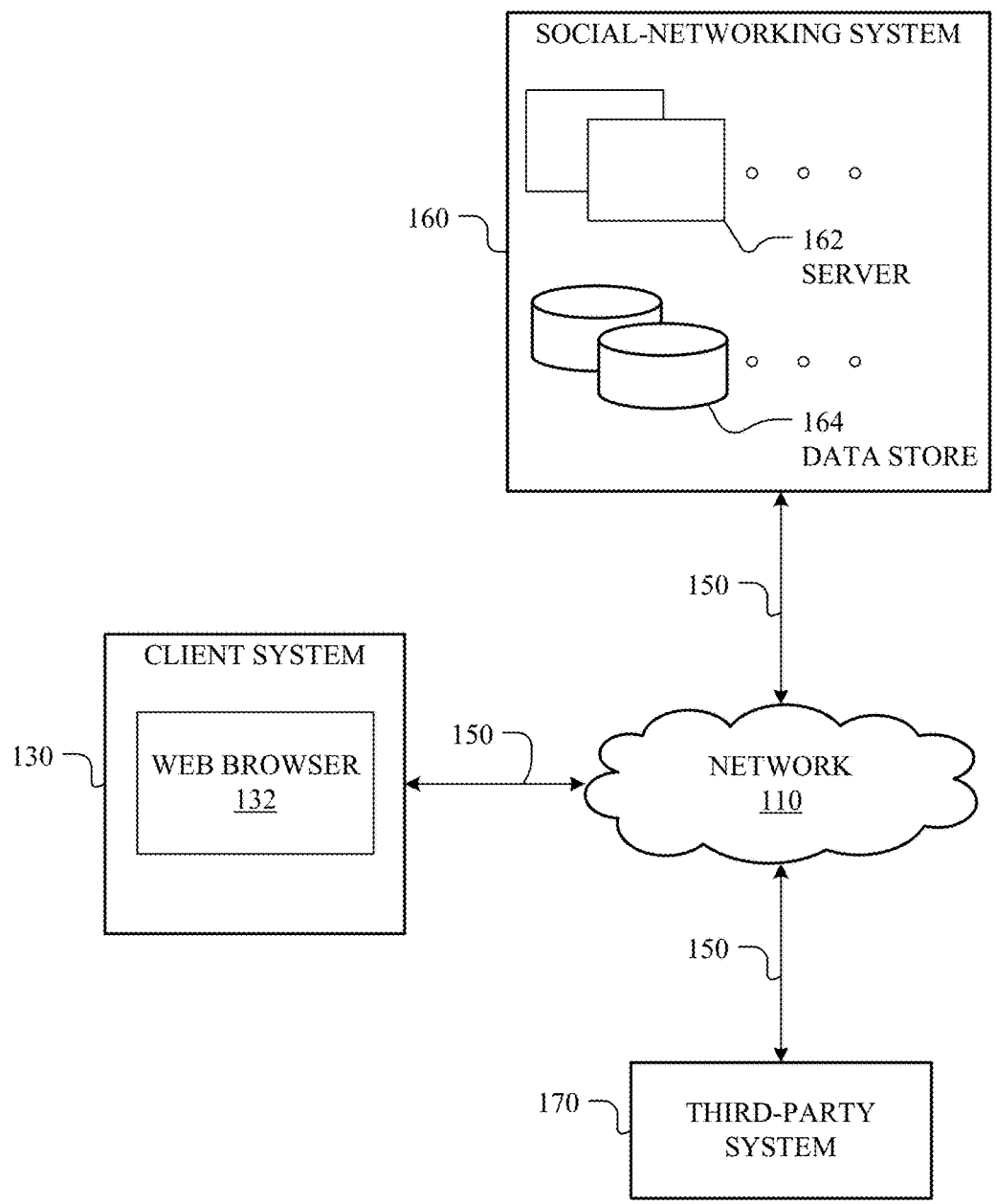
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
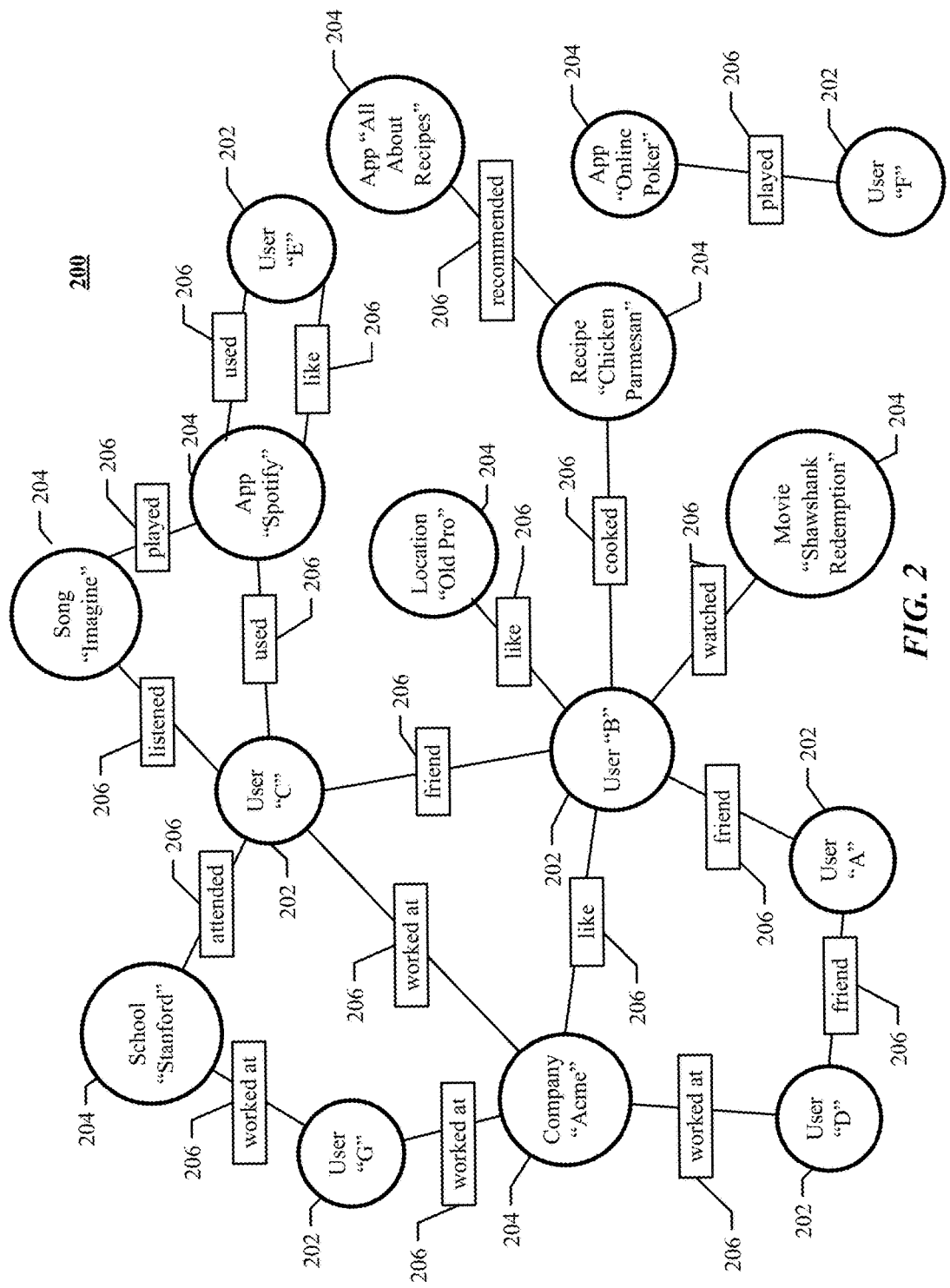
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. us 2012/0203831, entitled "Sponsored Stories Unit Creation from Organic Activity Stream" and filed 3 Feb. 2012 as U.S. patent application Ser. No. 13/020,745, or U.S. Patent Application Publication No. us 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 160 and incorporate the retrieved social-networking functionality or context into the advertisement before serving the advertisement to a user. Examples of selecting and providing social-networking-system functionality or context with an advertisement are disclosed in U.S. Patent Application Publication No. US 2012/0084160, entitled "Providing Social Endorsements with Online Advertising" and filed 5 Oct. 2010 as U.S. patent application Ser. No. 12/898,662, and in U.S. Patent Application Publication No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data: contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. US 2009/0070219, entitled "Targeting Advertisements in a Social Network" and filed 20 Aug. 2008 as U.S. patent application Ser. No. 12/195,321; U.S. Patent Application Publication No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. US 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. US 2012/0159635, entitled "Comment Plug-In for Third-Party System" and filed 15 Dec. 2010 as U.S. patent application Ser. No. 12/969,368; U.S. Patent Application Publication No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Application Publication No. US 2008/0040475, entitled "Providing a News Feed Based on User Affinity in a Social Network Environment" and filed 11 Aug. 2006 as U.S. patent application Ser. No. 11/503,093; U.S. Patent Application Publication No. US 2012/0072428, entitled "Action Clustering for News Feeds" and filed 16 Sep. 2010 as U.S. patent application Ser. No. 12/884,010; U.S. Patent Application Publication No. US 2001/0004692, entitled "Gathering Information about Connections in a Social Networking Service" and filed 1 Jul. 2009 as U.S. patent application Ser. No. 12/496,606; U.S. Patent Application Publication No. US 2008/0065701, entitled "Method and System for Tracking Changes to User Content in an Online Social Network" and filed 12 Sep. 2006 as U.S. patent application Ser. No. 11/531,154; U.S. Patent Application Publication No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. US 2012/0197709, entitled "Mobile Advertisement with Social Component for (Geo-Social-networking system" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application No. Ser. No. 12/978,265, filed 23 Dec. 2010, and U.S. patent application Ser. No. 13/632,869, filed 1 Oct. 2012, each of which is incorporated by reference.

In some embodiments, an application (referenced hereafter as the "social TV app") may be provided to run on client system 130. In general, the social TV app may be an application running on a smartphone (e.g., an iPhone) or any other client system 130 that interfaces with social-networking system 160 and MSOs. In an embodiment, the social TV app may display a programming guide. For example, the programming guide may aggregate various media content (hereinafter, "media content," "shows," and "programs" may be used interchangeably) from multiple content providers into a feed. As another example, the programming guide may display recommended media content based on social context. In some embodiments, the social TV app may not automatically update the programming guide so as not to confuse the user. Instead, the social TV app may present an interactive button to the user that allows the user to cause an update of the programming guide. The social TV app may determine a user's subscription package in an embodiment. In some embodiments, the social TV app may present a plurality of thumbnails representing previously-watched media content that allow the user to quickly switch back-and-forth between media content. Some embodiments may delay publishing that the user watched a particular program. In particular embodiments, the social TV app may determine that media content has multiple entities and provide social context for the entities. When there are multiple versions of a particular media content, some embodiments may aggregate likes of the various versions to a main page representing the media content. In some embodiments, the social TV app gives a user control over what is displayed on a second screen (TV, etc.). In some embodiments, the social TV app functions as a channel-changer. In some embodiments, the social TV app may interact with a dongle such as social TV dongle described in U.S. patent application Ser. No. 13/602, 011, which is herein incorporated by reference as an example and not by way of limitation. In some embodiments, social data from social-networking system 160 is integrated into what is displayed in the social TV app. For example, the social TV app may display who is currently watching a particular show, who has liked the particular show, and the like. FIGS. 3-17 discuss various embodiments of the social TV app.

Figure 3:
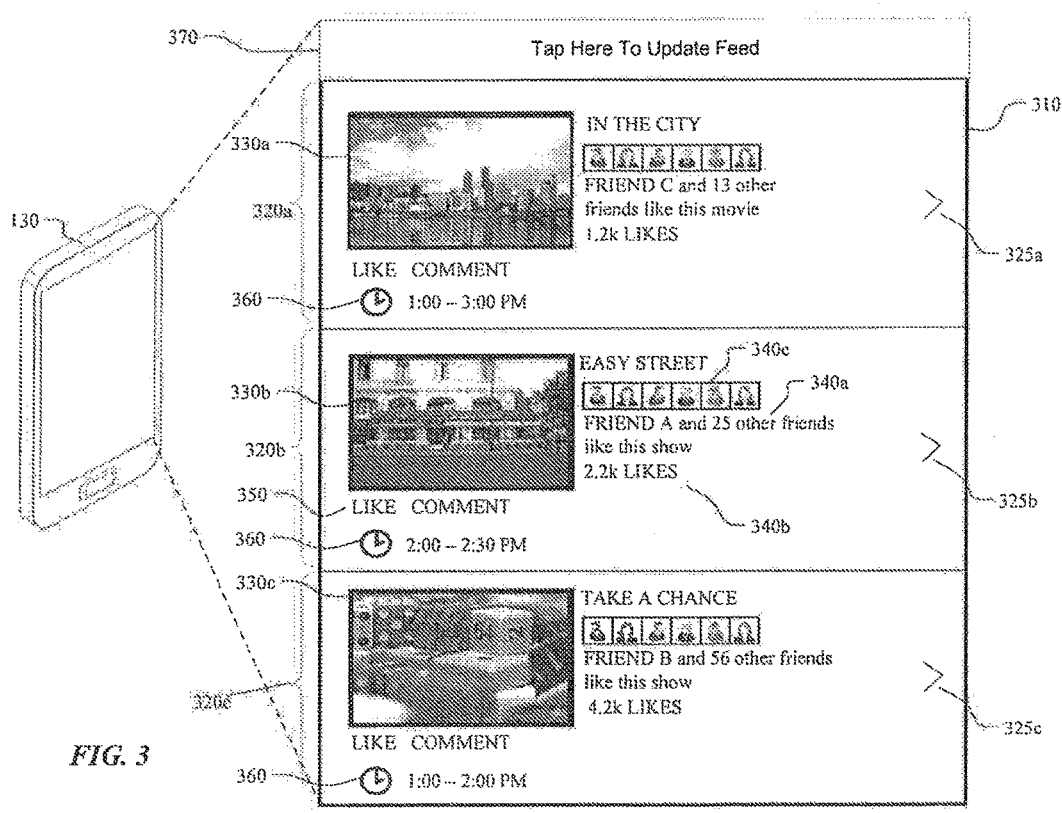
FIG. 3 illustrates an example programming guide, which may be displayed on a mobile device or any other client system.

FIG. 3 illustrates an example programming guide 310 which may be displayed on mobile device 130 or any other client system 130. In general, programming guide 310 provides an easy and convenient way for a user to view and select available content to display on any client system 130. In some embodiments, programming guide 310 is generated by social-networking system 160 using social graph 200 and is a personalized set of available media content to display to a user. For example, programming guide 310 may include media content that is available to the user along with social content related to the user and the media content. As another example, programming guide 310 may include recommended media content based on social context, as will be described below.

Figure 7:
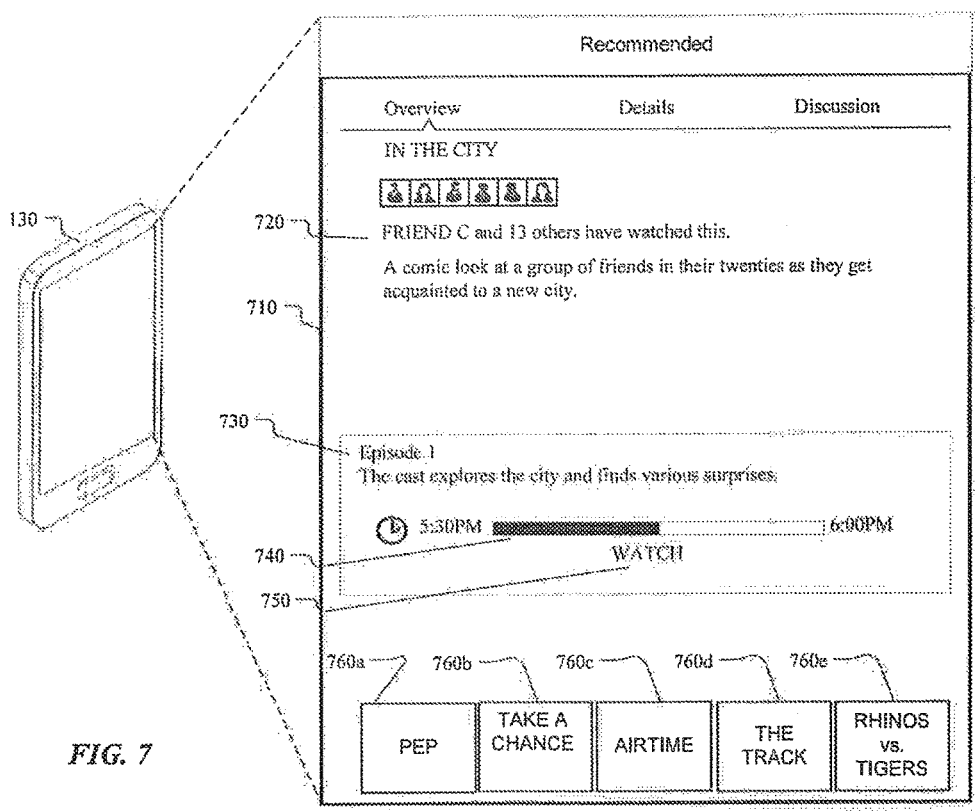
FIG. 7 illustrates an example embodiment of a show page.

Programming guide 310 may include a show feed or a recommendations feed (hereinafter, "show feed" and "recommendations feed" are used interchangeably), which aggregates content from multiple sources (e.g., over-the-top (OTT) content provider such as NetFlix, Hulu, Amazon Video, and YouTube, multiple system operators (MSO) such as Comcast, Time Warner, AT&T U-verse, and Dish Network, on-demand programming, DVRs, third-party internet sites, other cable provides, etc.) into a convenient list of available media content in an embodiment. In some embodiments, a central aggregation point is provided that allows the social TV app or social-networking system 160 to pull from multiple sources. In some embodiments, a canonical representation of all shows is stored in an open graph and the representation is agnostic of the channel of that show. The user is not required to know where the content is being sourced from or what channel is associated with the content. Instead, the user may simply tap or otherwise select programming guide entry 320 for a particular show and be presented with show page 710 for the particular show as illustrated in FIG. 7 and described below. In an embodiment, the user may tap interactive button 325 to be presented with show page 710. The user may then view information about the selected show and may select an option on show page 710 to begin watching the show, such as interactive watch button 750. The show will then be displayed on any client system 130, such as the user's smart phone or a television ("TV") of the user. In some embodiments, an action edge in the open graph tracks how the content is being watched (e.g., from Hulu, Netflix, cable, etc.).

Programming guide 310 includes programming guide entries 320 (e.g., programming guide entries 320a-c in this example) in certain embodiments. Programming guide entries 320a-c may each be associated with a particular media content and may each display information associated with its corresponding media content in an embodiment. In some embodiments, each programming guide entry 320 may be associated with a recommended program. Each programming guide entry 320 may include interactive button 325, media content image 330, social content 340 (e.g., social content 340a-c in this example), one or more user selectable options 350, and airing time 360.

Interactive button 325 may be associated with programming guide entry 320 in particular embodiments. Interactive button 325 may be any button operable to cause the social TV app to display a show page, such as show page 710, in response to a user selection of interactive button 325. For example, a user may select interactive button 325a to bring up a show page associated with the program "In the City." Although interactive button 325 is displayed in a particular configuration and in a particular location of programming guide entry 320, interactive button 325 may be displayed in any configuration, such as a circular button or a square button, and may be displayed in any location of programming guide entry 320.

Media content image 330 may be any image or graphic associated with the media content of programming guide entry 320. In some embodiments, media content image 330 may be an image captured from video associated with the media of programming guide entry 320. For example, media content image 330a may be an image captured from the TV show "In the City" of programming guide entry 320a. In some embodiments, media content image 330 may be a cover image provided by an entity associated with the media content of programming guide entry 320. For example, if a particular movie studio produced the movie "Take a Chance" of programming guide entry 320c, the movie studio may provide or otherwise indicate to social-networking system 160 a particular image to use as a cover image for the movie. Social-networking system 160 may then access the cover image and use it as media content image 330 to represent the movie in programming guide 310.

Social content 340 is any social content associated with the media content of programming guide entry 320 that is determined by social-networking system 160 from social graph 200. In some embodiments, social content 340 may include an indication of how many other users of social-networking system 160 have viewed, "liked," or posted comments about the media content of programming guide entry 320. Consider the example programming guide entry 320b of FIG. 3. In this example, the media content of programming guide entry 320b is a TV show called "Easy Street." Social-networking system 160 may query social graph 200 and determine that twenty six of the user's friends have "liked" the TV show "Easy Street." Social content 340b of programming guide entry 320b, which reads "FRIEND A and 25 other friends like this show" may then be generated and displayed proximate to media content image 330b for "Easy Street." In another example, social-networking system 160 may query social graph 200 and determine that over 2,200 other users have "liked" "Easy Street." Social content 340b, which reads "2.2 k LIKES," may then be generated and displayed proximate to media content image 330b for "Easy Street." In some embodiments, social content 340 may also include a facepile 340c. Facepile 340c may include, for example, images, icons, or avatars of other users (e.g., friends) of social-networking system 160 who have liked the media content of programming guide entry 320, as determined using social graph 200.

User-selectable options 350 are any options that permit a user to perform one or more actions associated with programming guide entry 320. For example, user-selectable options 350 may include options that the user may select to indicate that he "likes" the media content of programming guide entry 320 or to comment about the media content of programming guide entry 320. Once selected, user-selectable options 350 may cause any appropriate action within social-networking system 160. For example, if a user selects user-selectable option 350 to "like" the media content of programming guide entry 320b (i.e., "Easy Street"), an edge 206 may be added to social graph 200 to indicate that the user "likes" "Easy Street." 175) User selectable options 350 may include other options, such as record and remind, in an embodiment. For example, "RECORD" may be included as a user selectable option 350 in programming guide entry 320 and may cause, once selected by a user, instructions to be sent to another device such as a DVR to record the media content of programming guide entry 320. In some embodiments, a primary action may also be established for each programming guide entry 320 (e.g., watch again, watch, record, etc.) using user selectable options 350.

As another example, "REMIND" may be included as a user selectable option 350 in programming guide entry 320 and may cause, once selected by a user, a notification to be sent to the user when the media content of programming guide entry 320 is about to begin. A "WATCH" button may be presented to the user to automatically start the show on the user's TV when the user selects the button in certain embodiments.

In some embodiments, the social TV app determines what and when to notify the user of recommended programs. The social TV app may determine this using recommendations, trending programs, programs promoted by a network the user "liked," user "likes" of an article about the program, user "likes" of an actor in a program, etc. In some embodiments, the social TV app or social-networking system 160 determines where to send the notifications and reminders. For example, if it is determined that the user is currently using his smartphone, a notification may be sent to the user's smartphone. In some embodiments, when a user receives a notification that a friend is currently watching a program, a "WATCH" button appears in the user's newsfeed which, when selected, starts the program on the user's TV.

Airing time 360 is any indication of the times in which the media content of programming guide entry 320 may be viewed. For example, airing time 360 of programming guide entry 320a indicates that the movie "In the City" will begin at 1:00 PM and end at 3:00 PM. As another example, airing time 360 of programming guide entry 320b indicates that the TV show "Easy Street" will begin at 2:00 PM and end at 2:30 PM.

Programming guide 310 may include a recommendations feed in certain embodiments. In certain embodiments, the recommendations feed displays recommended programs based on social context for the particular user. For example, social-networking system 160 may determine recommended programs for the user based on "likes" of the user (e.g., an explicit signal that the user likes the program), "likes" of the friends of the user, total "likes" from all users of social-networking system 160, comments of the user or the user's friends, tastes of people who have "liked" the program, trending programs, programs that have similar genres to programs the user has "liked," and programs that are promoted by a network that the user "likes." In certain embodiments, the content in the recommendations feed is determined according to the methods described in FIGS. 25-26 and associated text in U.S. patent application Ser. No. 13/602,011, which is herein incorporated by reference as an example and not by way of limitation.

The recommendations feed in the social TV app displays what is currently on (i.e., what programs are currently available to view) as well as programs that are coming on soon (e.g., within the half hour, hour, day, week, etc.) in certain embodiments. In some embodiments, the recommendations feed includes recommendations for recorded content (e.g., on a DVR), on-demand content, and pay-per-view content, not just channels that are available from the STB. In certain embodiments, the social TV app displays the number of "likes" for programs (e.g., the user's "likes," friends' "likes," total "likes," etc.), who has "liked" the program, and who is currently watching the program. In certain embodiments, media content and social content displayed in the social TV app are actionable. For example, the number of "likes" for programs (e.g., the user's "likes," friends' "likes," total "likes," etc.), who has "liked" the program, who is currently watching the program, etc., are each actionable (e.g., the user may click on the indication to view more information, chat with the displayed user, bring up another page, etc.). As another example, each media content may be clicked so that the user may watch the media content (e.g., change the channel to watch the media content) or get more information about the media content. In certain embodiments, the social TV app may be a full screen app or a hybrid.

Recommendations for the show feed in the social TV app may be based on positive and negative feedback in an embodiment. For example, a program may receive positive feedback (and thus may appear in the user's show feed) if the user "likes" the program, if the user watches the program, if the user indicates he wants to watch the program, if the user comments about the program, and the like. As another example, negative feedback may be applied to programs in some situations. For example, the following situations may result in negative feedback for a program (and thus may remove the program from the user's feed or move it lower in the feed):
  where in show feed the selected program was: negative feedback may be applied to programs that the user skipped in the list
  if a program is a different genre (less negative weighting for genres other than selected genre)
  different run times (e.g., if a thirty-minute program was selected, negatively weight a two-hour program, etc.)
  how much time has elapsed in the current program
  comparison of selected program to programs not selected
  comparison to everything on screen (e.g., if the user is flicking past programs quickly and then stops suddenly to select a program, negatively weight programs not selected less; if scrolling slowly or flicking fast and then stop for an extended time, more negative weighting for programs not selected)
  start watching a program and then switch away or off may result in negative feedback for the program
  if user turns off TV, negatively weight the program that was on (but may look at other factors to determine if there was another reason such as inbound messages, a phone call, etc.)

The social TV app may determine that a user does not have access to a certain program or channel (e.g., the user's cable subscription does not include the channel) and thus may lower the weighting for the channel in some embodiments. As a result, the program or channel may be lowered on the user's show feed or removed altogether. In some embodiments, the user can create a blacklist of shows/programs/channels/genres/etc. that the user does not want to see in his recommendations feed. For example, the user may indicate to the social TV app that he does not want to see any sports channels, any Spanish channels, any pornography, or any other particular content or channel.

Recommendations for the show feed in the social TV app may be time-based recommendations (e.g., based on the MSO) in certain embodiments. In some embodiments, sponsored content may be included in the recommendations feed. For example, a network may pay to include certain programs in users' show feeds.

The social TV app requests a recommended list of shows for a particular user from a server of social-networking system 160 in particular embodiments. The server may then send a list of recommended programs along with metadata (e.g., title, social context, etc.) in one fetch. In some embodiments, the recommendations may be paginated (e.g., programs 1-10, programs 11-20, etc.). In some embodiments, a linkage may exist between the sets so that only one session between client system 130 and the server is required.

The social TV app may be integrated with the user's DVR or STB, as discussed more fully below, in certain embodiments. For example, an indication such as "record this for me" may be presented next to a program in the social TV app. Once selected, the social TV app may send instructions to the DVR or STB to record the show. In certain embodiments, methods such as those described in reference to FIGS. 6-7 and associated text in U.S. patent application Ser. No. 13/602,011, which is herein incorporated by reference as an example and not by way of limitation, may be utilized to send instructions to the DVR or STB.

Programming guide 310 may not automatically update to avoid confusing the user in an embodiment. Instead, programming guide 310 may include update action button 370, which may require some user interaction to update programming guide 310. In an embodiment, update action button 370 is operable to cause social-networking system 160 to update programming guide 310. Update action button 370 is a visual indication that a user action may be required to update programming guide 310 in certain embodiments. For example, programming guide 310 may display a message that indicates that the user may select update action button 370 to update programming guide 310, such as "Tap Here To Update Feed." In some embodiments, the user action is a touch input on a mobile device or client system 130.

Programming guide 310 may automatically update in some embodiments. In an embodiment, programming guide 310 is automatically updated after a certain amount of time has passed since the last update. For example, programming guide 310 may automatically update after a half hour, an hour, a day, or any other time period after the last update. In another embodiment, programming guide 310 is silently updated if it is inactive for a certain amount of time. For example, if a user has not interacted with programming guide 310 within the past half hour, programming guide 310 may be automatically updated. In yet other embodiments, programming guide 310 is automatically updated a certain amount of time before each half hour. As an example, programming guide 310 may be automatically updated five minutes before the top or bottom of the hour. In some embodiments, programming guide 310 is updated if the user scrolls down a certain amount in programming guide 310. For example, programming guide 310 may be updated if the user scrolls down ten shows.

Programming guide 310 may visually fade down while programming guide 310 is being updated and visually fade up after programming guide 310 is updated in an embodiment. After programming guide 310 visually fades up, programming guide 310 may provide the user with newly recommended media content. In some embodiments, other portions of the social TV app or other apps may utilize the disclosed logic to update any temporal content. For example, show times for movies may be updated according to the disclosed logic.

As an example embodiment of operation, programming guide 310 may present the user with programming guide entries 320*a-c*. Programming guide 310 may also display update action button 370 that displays to the user "Tap Here to Update Feed." To avoid user confusion, programming guide may not automatically update itself. Instead, the user may tap update action button 370, which causes the social TV app to update the entries in programming guide 310. When the user selects update action button 370, programming guide 310 may visually fade down while it updates and visually fade back up with newly recommended programs after the update is complete.

Figure 4:
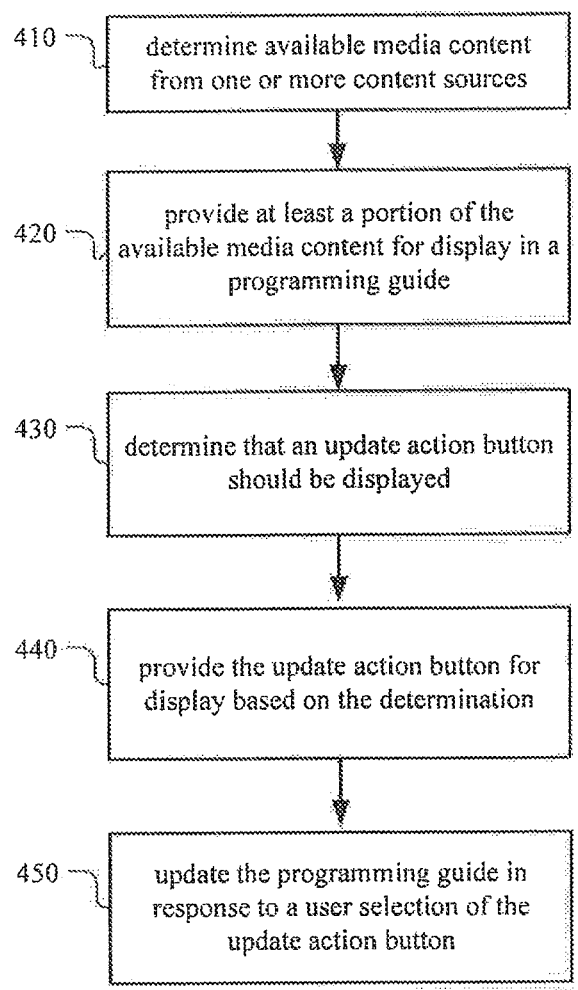
FIG. 4 is a flow chart illustrating an example method for updating time-sensitive content.

FIG. 4 is a flow chart illustrating an example method 400 for updating time-sensitive content. The method 400 may begin at step 410, where available media content is determined from one or more content sources. In some embodiments, the media content includes TV programs and movies. In some embodiments, the available media content includes TV programs and movies that are available from a MSO, OTT, or any other provider as described above. In some embodiments, the available media content is any TV program or movie that is currently airing or will be airing in the near future (e.g., in the next half hour, hour, day, week, etc.). In some embodiments, the available media content is determined as described above in reference to FIG. 3.

In step 420, at least a portion of the available media content from step 410 is provided for display in a programming guide on a display device of a user. In an embodiment, the programming guide includes a plurality of entries, such as entries 320*a-c*. Each of the entries may be associated with particular available media content, such as a program, movie, or game. For example, entry 320*a* is associated with the program "In the City." As another example, entry 320*b* is associated with "Easy Street." In some embodiments, the display device is a smart phone, tablet, TV, or any other client system 130. In this manner, the user is able to quickly determine what media content is available to watch by reviewing each of the plurality of entries that are associated with a particular media content.

In step 430, it is determined that an update action button should be displayed on the display device. An update action button may be displayed whenever the programming guide is displayed in certain embodiments. For example, if the user opens the programming guide in the social TV app, the update action button may be displayed when the programming guide is loaded. In some embodiments, the update action button is update action button 370 described above.

In step 440, the update action button is provided for display on the display device when it is determined in step 430 that the update action button should be displayed. In some embodiments, the update action button may include a visual indication that the user may select the update action button to update the programming guide. For example, the update action button may include a message indicating that a user may "Tap Here To Update Feed." Although a particular example configuration of an update action button is illustrated, any visual indication that the user may perform some input to update the programming guide is suitable. In an embodiment, update action button 370 is operable to cause the social-networking system to update the programming guide in response to a user selection.

In step 450, the programming guide is updated in response to a user selection of the update action button. In an embodiment, the user selection is a touch input on the display device. For example, the user may tap the update action button. Although particular touch inputs are discussed, any touch input on or near the update action button is suitable. In some embodiments, the programming guide fades down while it is updating and fades up with newly recommended media content after it has updated. For example, once a user selects update action button 370, programming guide 310 may fade down and display at least one newly recommended show.

Method 400 may additionally include querying a social graph of the social-networking system for social content associated with the available media content and one or more users of the social-networking system in certain embodiments. In some embodiments, the social graph is social graph 200 and includes a plurality of nodes and edges connecting the nodes, the nodes comprising user nodes that are each associated with a particular user of the social-networking system. Method 400 may also include providing at least a portion of the queried social content from the social graph for display along with the available media content on the display device. In some embodiments, the social content is one or more of an indication of a number of other users of the social-networking system who have viewed the available media content, an indication of a number of other users of the social-networking system who have "liked" the available media content, an indication of a number of other users of the social-networking system who have shared the available media content, an indication of a number of comments about the available media content, or a facepile.

In some embodiments, method 400 may include determining, using social content from social graph 200 and the available media content determined in step 410, a plurality of social coefficients for the user. The social coefficients may then be used to determine recommended media content for the user. At least a portion of the recommended media content may then be provided for display in the programming guide on the display device.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
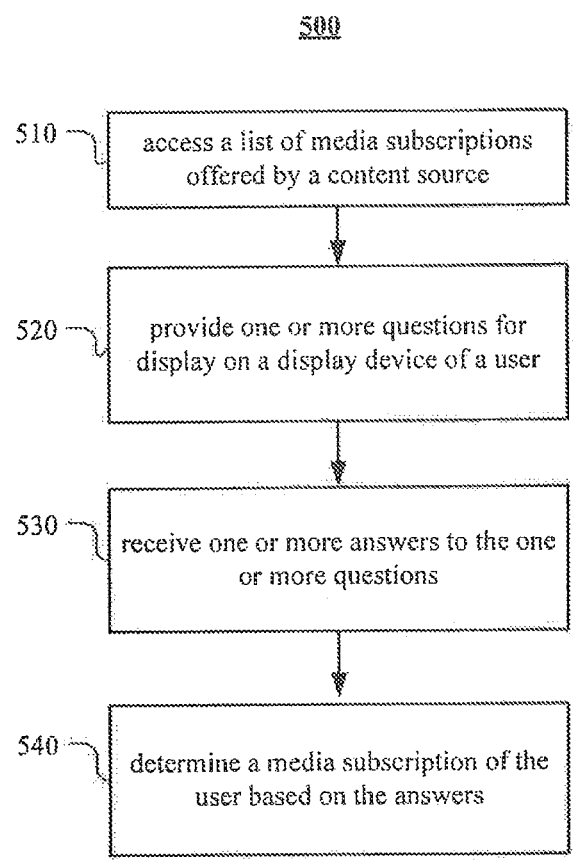
FIG. 5 is a flow chart illustrating an example method for determining user subscriptions.

FIG. 5 is a flow chart illustrating an example method 500 for determining user subscriptions. Method 500 may begin at step 510, where a list of media subscriptions offered by a content source is accessed. In an embodiment, step 510 includes accessing a list of all available packages from a content source. For example, the social TV app may pull a list of packages from the MSO using an application programming interface (API). In an embodiment, a media subscription includes a package of channels. For example, a media subscription may include a basic cable package, a basic cable plus package, or a premium cable package. Each media subscription may offer different channels or shows. For example, a basic cable package may not offer HBO, whereas a premium cable package may offer HBO. In an embodiment, a content source may include any media content provider. For example, a content source may include an MSO, an OTT, or any other content provider.

In step 520, one or more questions are provided for display on a display device of the user. In an embodiment, a setup wizard questionnaire provides questions for display to the user to determine the user's current subscription information. For example, the wizard may ask the user "Do you get HBO?" In some embodiments, the wizard may ask follow-up questions. For example, if the user indicates that he does not get HBO, then the wizard may prompt the user "We don't think you get these channels either. Do you get these?"

In step 530, one or more answers to the one or more questions are received. In an embodiment, one answer may indicate that the user does not subscribe to a particular channel. For example, the social TV app may receive an answer indicating that the user does not get HBO. As another example, the social TV app may receive an answer confirming that the user does not get certain channels.

In step 540, a media subscription of the user is determined based on the one or more answers. For example, if the user answers that he does not get HBO, and the list of available packages from the MSO indicates that HBO is available on all packages except for the basic cable package, the social TV app may determine that the user has the basic cable package. In another embodiment, the social TV app may determine a list of other media content that the user does not subscribe to based on an indication that the user does not subscribe to a particular channel. For example, if the user indicates that he does not get HBO, then the social TV app may determine a list of other channels that the user likely does not get. In that example, the social TV app may provide an interactive prompt for display on the display device operable/configured to confirm that the user does not subscribe to the list of other media content. For example, the social TV app may provide a prompt stating "We don't think you get these channels either. Do you get these?" Based on the user's answer, the social TV app can determine the user's media subscription.

Method 500 may additionally include determining unavailable media content based on the media subscription. In an embodiment, the social TV app may determine the programs or channels that are unavailable under the user's subscription. For example, the social TV app may determine that a user's basic cable package does not include channels 50 and above. Method 500 may also include providing at least a portion of the unavailable media content for display in the programming guide on the display device so that at least one of the entries in the programming guide is associated with unavailable media content. For example, the entries associated with the unavailable media content may include a visual indication that the media content is unavailable under the user's subscription. In that example, the visual indication may be a black-out of the unavailable media content in the programming guide. In another embodiment, at least one of the entries associated with the unavailable media content is provided for display below at least one entry associated with available media content in the programming guide. In other words, the unavailable media content may be pushed lower in the programming guide.

Method 500 may also include providing an interactive feature associated with the unavailable media content for display on the display device. For example, the unavailable media content may be put behind a paywall. In that example, the paywall may present a visual indication allowing the user to take some action to subscribe to the channel, such as "Click here to subscribe." By selecting the indication, the user may be presented with the option to purchase a subscription to the unavailable media content for a certain amount of time. For example, the user may purchase the subscription for a single viewing of a program, a day, a week, a month, or any other time period.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6A:
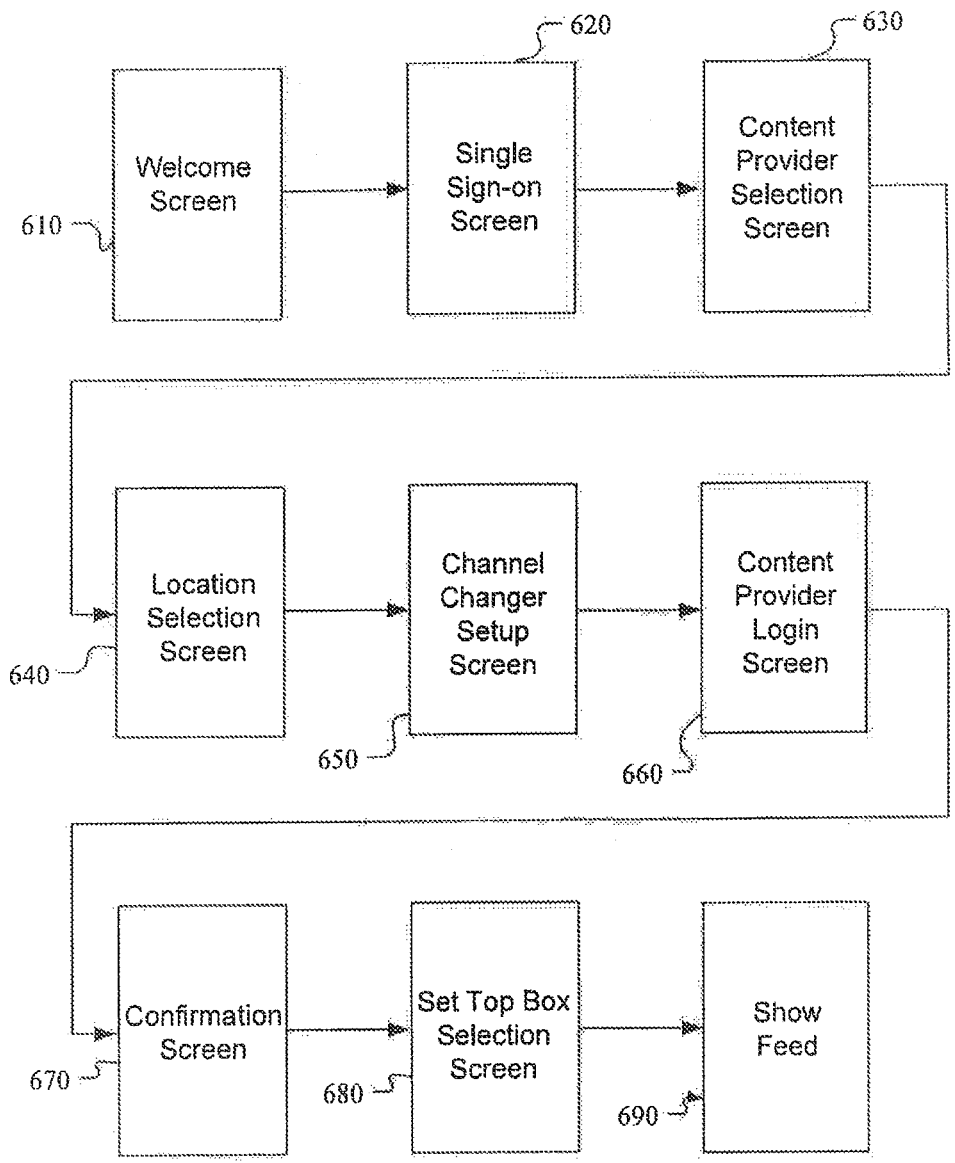
FIG. 6*a* is a flow chart illustrating an example embodiment for configuring the social TV app.
Figure 6B:
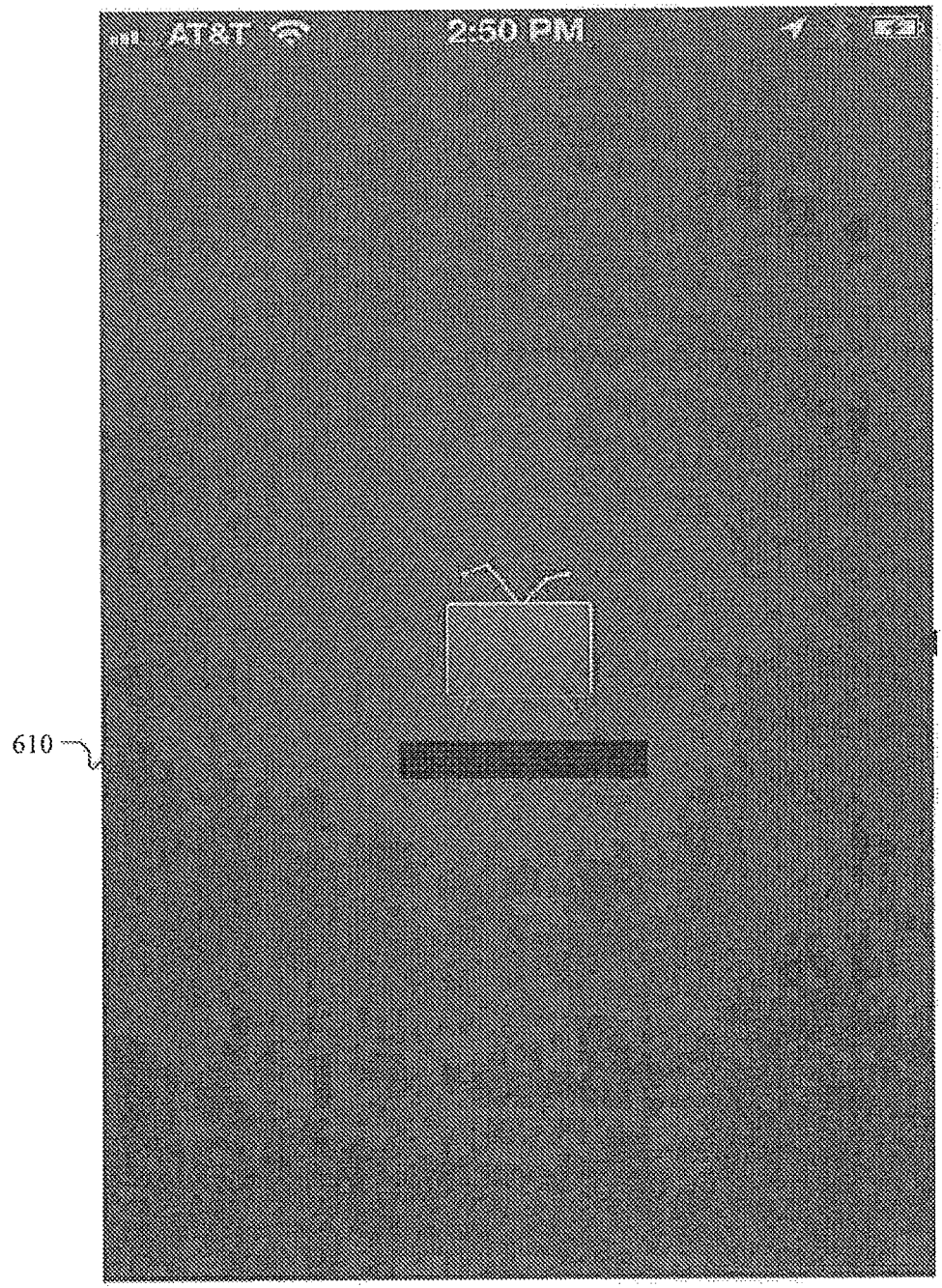
FIGS. 6*b*-6*i* illustrate example embodiments associated with the example steps of the flow chart illustrated in FIG. 6*a*.

FIG. 6a is a flow chart illustrating an example embodiment for configuring the social TV app. FIGS. 6b-6i illustrate example embodiments associated with the example steps of the flow chart illustrated in FIG. 6a Welcome screen 610, as illustrated in FIG. 6b, may be presented to the user in some embodiments. Welcome screen 610 may display a welcome message to the user in some embodiments. In an embodiment, the user may proceed directly to single sign-on screen 620.

Figure 6C:
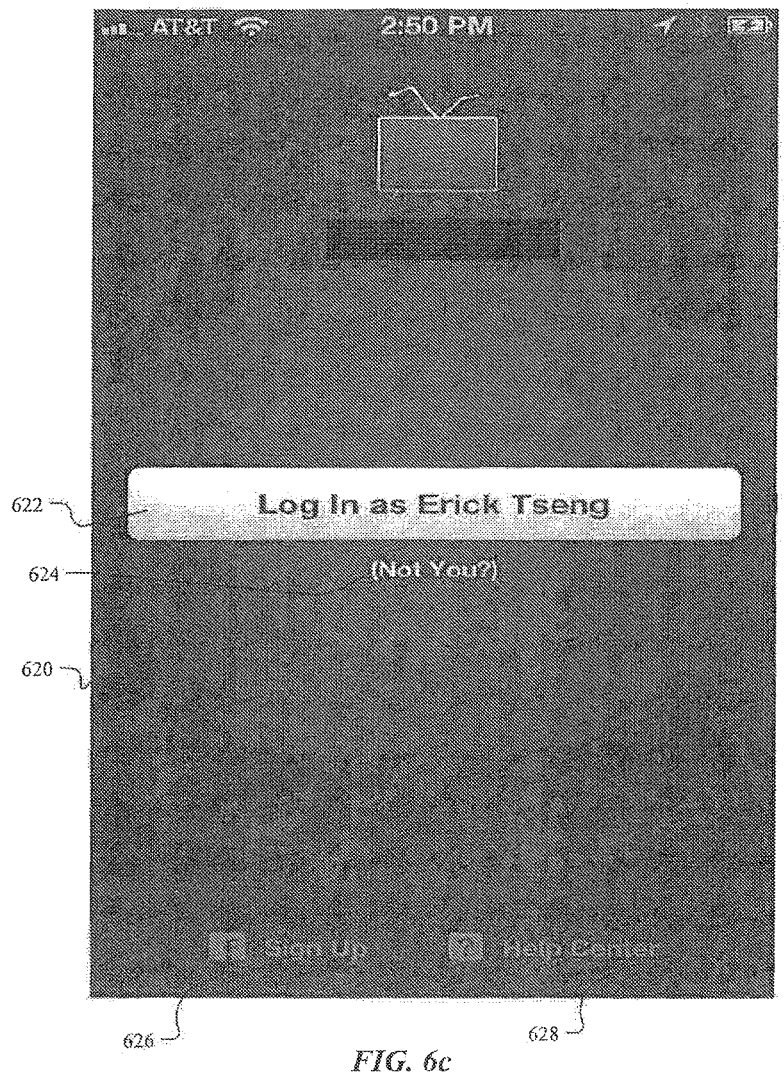

At sign-on screen 620, shown in FIG. 6c, a user may enter the user's login information for the social TV app. In some embodiments, the social TV app may utilize single sign on so that a user may quickly log in. For example, the social TV app may present the user with interactive button 622, which may allow the user to enter a user input to login without entering any credentials if the user has previously entered login information. The social TV app may also present the user with second interactive button 624, which allows the user to access a login screen if the user is not the user whose sign-on information is stored. Some embodiments may present various other interactive buttons, such as third interactive button 626, which allows for a user to sign up for a social-media account (e.g., Facebook), or fourth interactive button 628, which allows a user to access a help center.

Figure 6D:
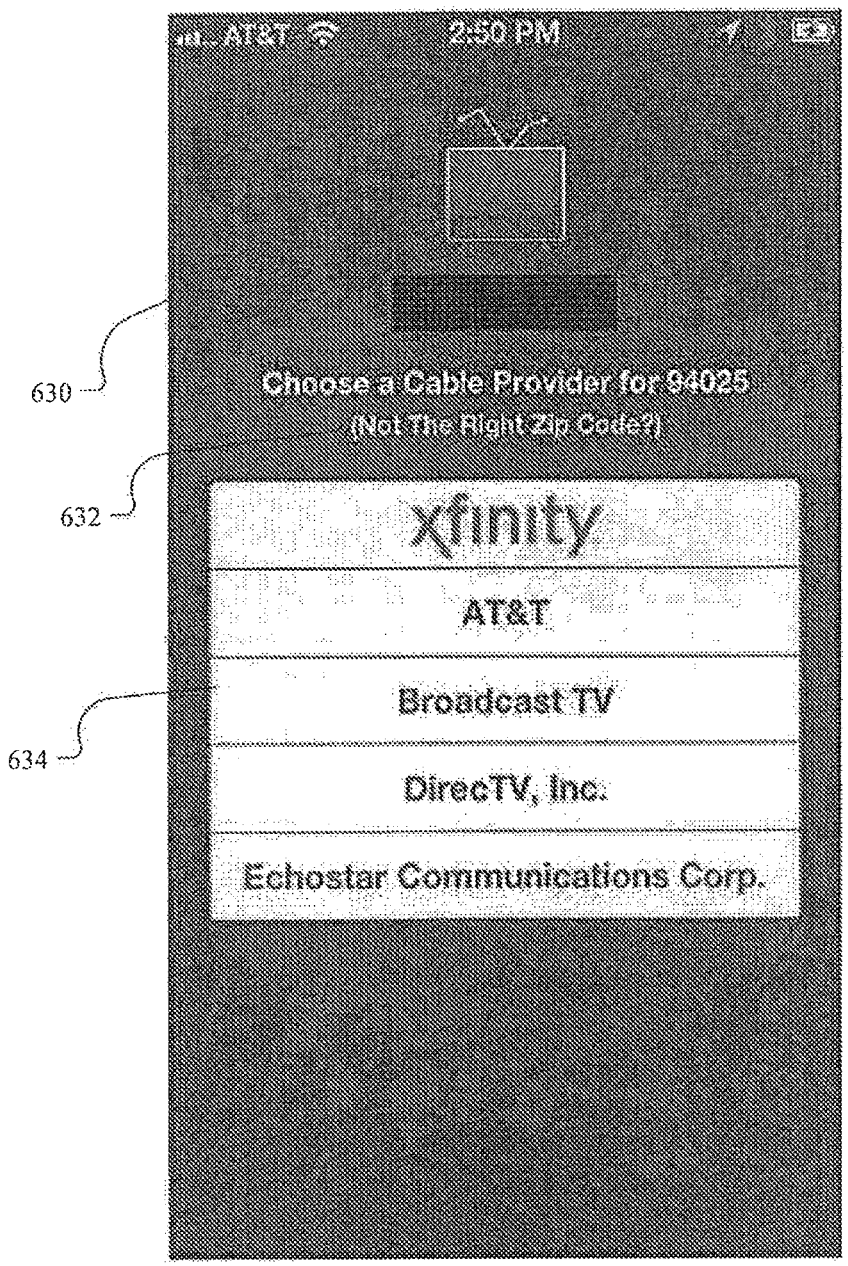

Once the user logs in, content provider selection screen 630 may be presented to the user as illustrated in FIG. 6d in certain embodiments. In an embodiment, content provider selection screen 630 may provide various interactive buttons. For example, interactive button 632 allows the user to enter a new zip code, which may result in the presentation of different providers. As another example, interactive buttons 634 can each be associated with a particular content provider, such as interactive buttons 634 that each correspond to a different provider. Content provider selection screen 630 may allow the user to choose a content provider for the user's current location in certain embodiments. For example, the user may select a particular MSO or OTT content provider.

Figure 6E:
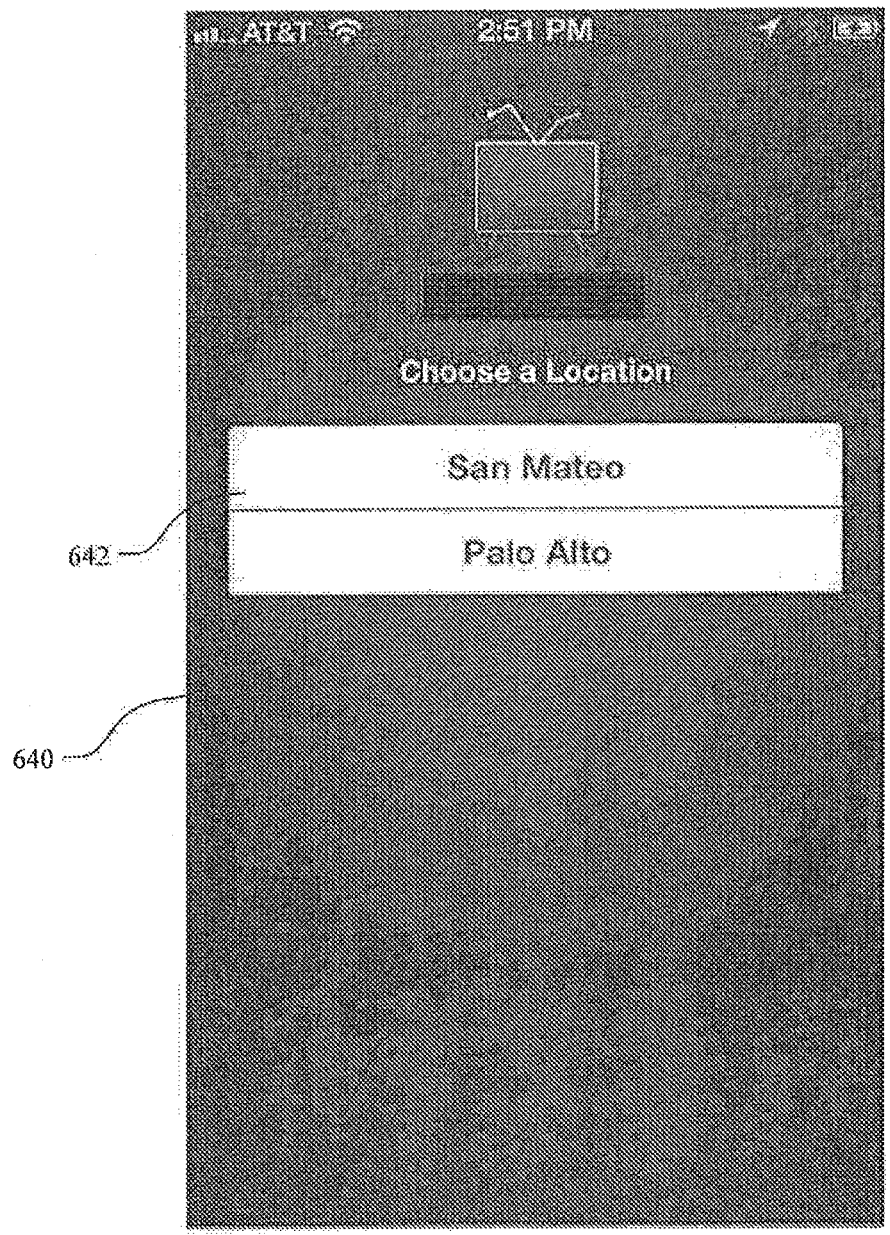

Once the user selects a content provider, location selection screen 640 may be provided for display as illustrated in FIG. 6e in certain embodiments. In an embodiment, location selection screen 640 may provide interactive buttons 642 each associated with a particular location (e.g., New York, Dallas, Palo Alto, etc.). A user may select their location by touching any of the interactive buttons 642 corresponding to the user's location in an embodiment.

Figure 6F:
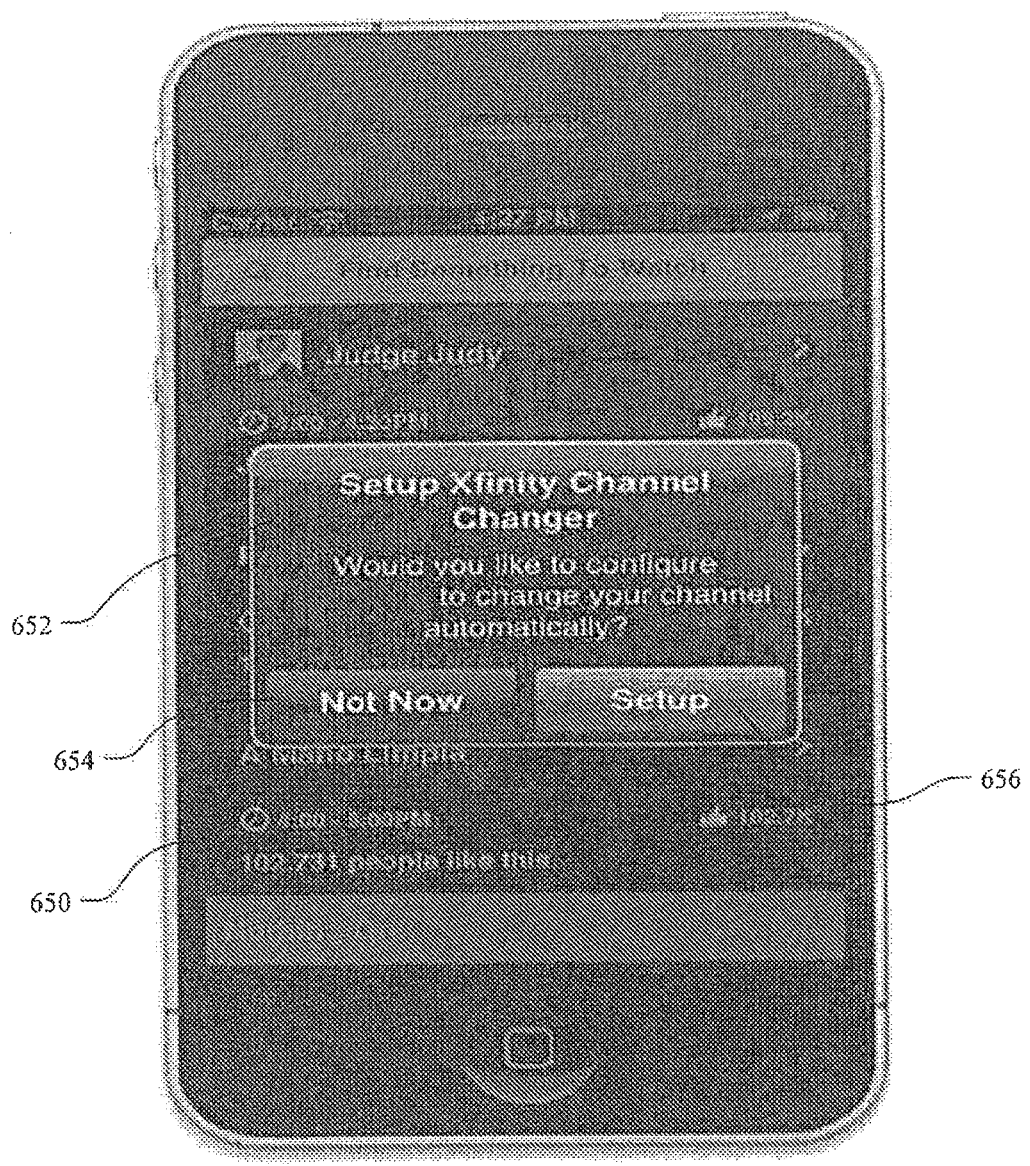

Channel changer setup screen 650, which is illustrated in FIG. 6f, is displayed in certain embodiments. Channel changer setup screen 650 allows the user to configure the social TV app to change channels on a STB automatically in an embodiment. Channel changer setup screen 650 includes popup box 652 and interactive buttons 654 and 656 in some embodiments. The social TV app may utilize a standard plug-n-play protocol to discover all available STBs in certain embodiments. Social ITV app may present popup box 652 to the user to control discovered STBs. For example, the social TV app may display the message "We have discovered these STBs. Would you like to use one to control?" As another example, the social TV app may display the message "Would you like to configure the app to change your channel automatically?" In some embodiments, the social TV app may defer the decision to setup an STB for a later time. For example, the social TV app may present the user an option to defer setup, such as interactive button 654 that corresponds to a "Not Now" option. If the user elects to control a STB, such as by clicking on interactive button 656 that corresponds to a "Setup" option, the social TV app may present the user with the user's content provider's login screen 660 in an embodiment.

Figure 6G:
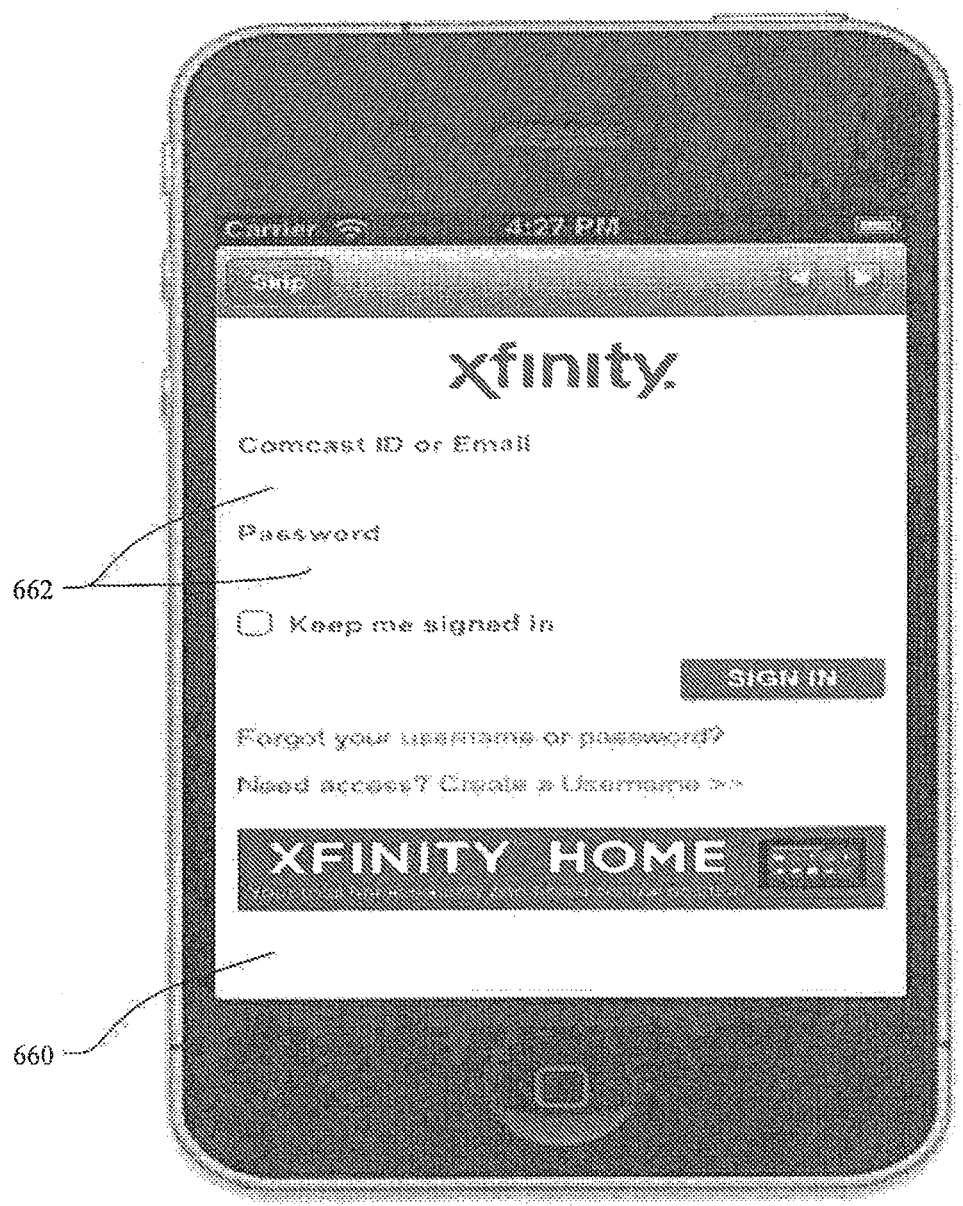

Content provider login screen 660, illustrated in FIG. 6g, includes text entry areas 662 in an embodiment. Text entry areas 662 may allow a user to enter login information. Once the user enters the correct login information, the user may be presented with a confirmation screen 670 in some embodiments.

Figure 6H:
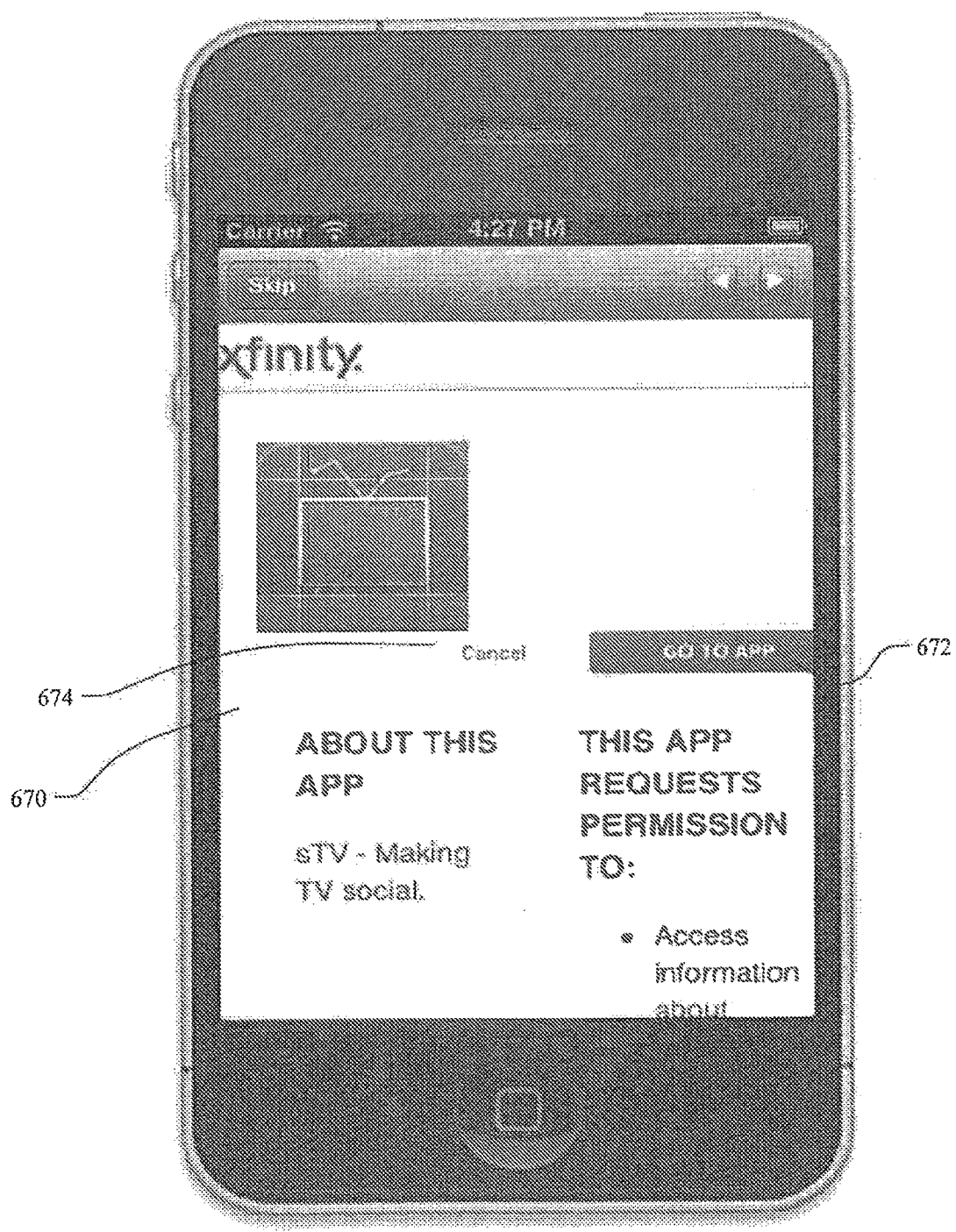

Confirmation screen 670, illustrated in FIG. 6h, includes confirmation button 672 and cancel button 674 in an embodiment. Confirmation button 672 allows a user to confirm that the user wishes to use the app in an embodiment. Cancel button 674 allows the user to choose not to proceed with using the social TV app. After confirming that the user wishes to use the social TV app, the user may be presented with set top box selection screen 680 in an embodiment.

Figure 6I:
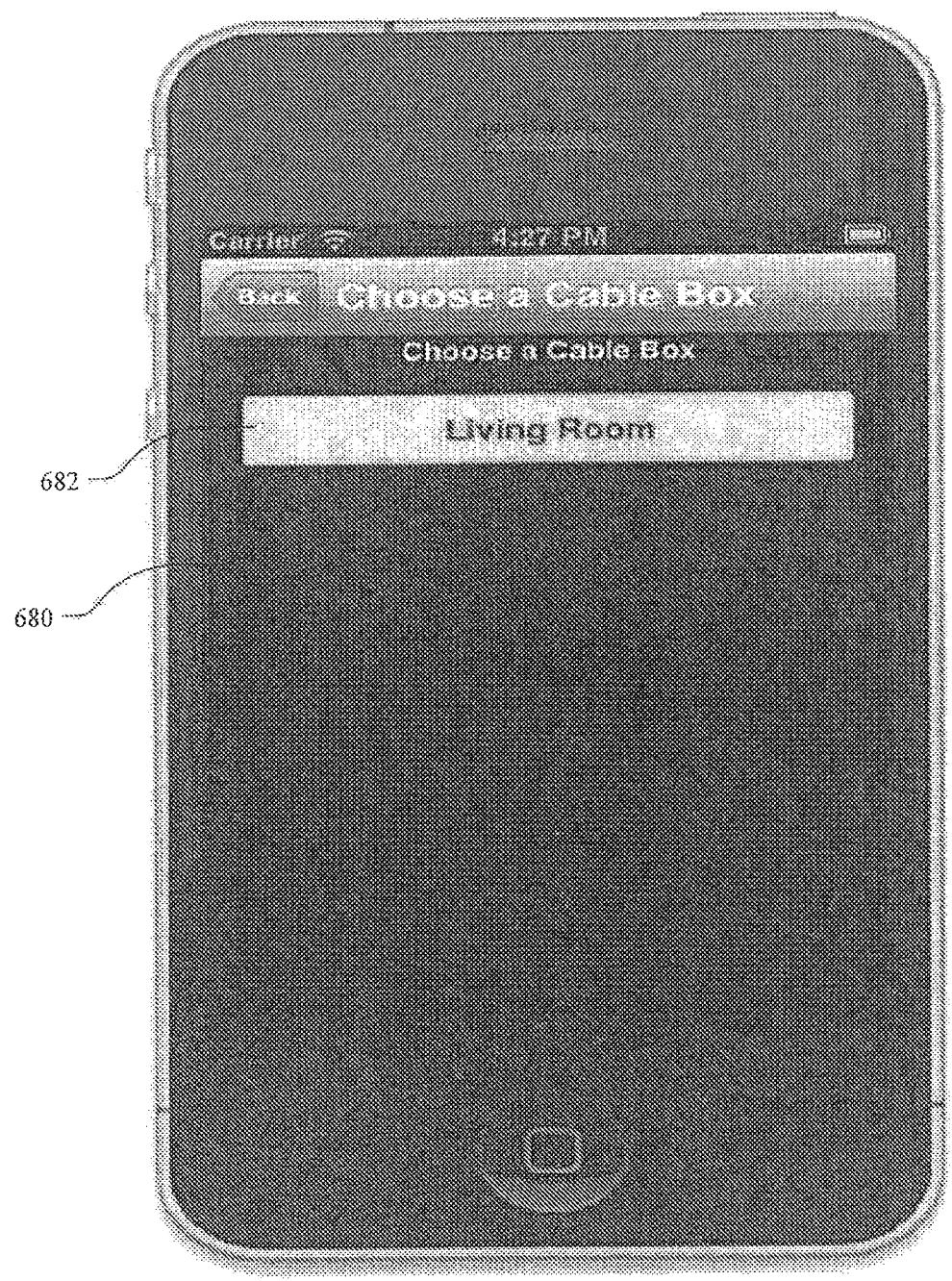

Set top box selection screen 680, illustrated in FIG. 6i, includes interactive button 682 in an embodiment. Interactive button 682 may be associated with a particular set top box in a particular location. For example, the button may display a visual indication that the button is associated with a set top box in the living room of the user's current location. Once the user confirms which set top box that the user wants to control, show feed 690 is provided for display on a display device of the user. In some embodiments, show feed 690 may be programming guide 310 described above.

FIG. 7 illustrates an example embodiment of show page 710. Social TV app may provide a page for each show, such as show page 710, in certain embodiments. In an embodiment, show page 710 is presented to the user when the user selects the show associated with show page 710 in programming guide 310. For example, the user may select interactive button 325a to bring up show page 710 associated with "In the City." Show page 710 may include social content 720, show information 730, visual indicator 740, interactive watch button 750, and thumbnails 760.

In an embodiment, social content 720 from social-networking system 160 may indicate who is currently watching the program, who "likes" the program, their current presence, and any other information about other users. For example, show page 710 may display an indication that "Colin is currently watching this program." In an embodiment, social content 720 may display everyone who is currently watching the show and may remove users from the list when they quit watching the show.

Show information 730 is displayed with show page 710 in an embodiment. Show information 730 may include episode or movie information, a description of the program, a time when the program started, a time when the program ends, or how much time is remaining in the program. For example, show information 730 may display the episode number in a season of a program, such as "Episode 1" as illustrated in FIG. 7. As another example, show information 730 may include details about the program in general or details about the particular episode, such as "The cast explores the city and finds various surprises."

Visual indicator 740 may be displayed with show page 710 in an embodiment. Visual indicator 740 may indicate what time a program started, what time the program ends, a percent completion of the program, or a time remaining in the program. For example, visual indicator 740 may be a progress bar that provides a visual indication of how much of the show remains. As another example, visual indicator 740 may display that the program started at 5:30 P.M. and ends at 6:00 P.M.

Interactive watch button 750 is displayed with show page 710 in certain embodiments. Interactive watch button 750 may allow the user to switch to the program shown in show page 710 to watch the program. For example, a user may select interactive watch button 750 to switch from a program that the user is currently watching to "In the City." In some embodiments, the social TV app may show the next content for the particular channel in the last few minutes of a program (e.g., the last five minutes). For example, the social TV app may display a show page corresponding to programming guide entry 320b associated with the program "Easy Street" at 1:55 P.M, which is five minutes before the start time of "Easy Street." The user may then select an interactive watch button on the show page for "Easy Street" to switch from the program the user is watching to "Easy Street."

Plurality of thumbnails 760a-e may be displayed with show page 710 in some embodiments. Social TV app may provide a multiview presentation of programs, such as thumbnails 760a-e, that allows the user to quickly switch between two or more shows in some embodiments. Thumbnails 760a-e may each be operable to change from media content that the user is currently watching to media content that the user previously watched (e.g., the media content corresponding to the thumbnail that the user selected). For example, if the user is currently watching the show "In the City," and the user selects thumbnail 760d, which represents the program "The Track," the social TV app would switch from the program "In the City," to "The Track."

Each of thumbnails 760a-e may be a visual indication representing media content that the user previously viewed. For example, if the user previously watched the program "Airtime," one of thumbnails 760a-e may correspond to "Airtime." In an embodiment, the visual indication includes information associated with the media content that the user previously viewed. Generally, the information may include a logo representing the program, text, a score of a game, an amount of time remaining in a game, information about the program, or any other information associated with the media content. For example, if a user is switching back-and-forth between four football games, each football game may be represented by a thumbnail or card that includes information, such as the score of the game, the amount of time left in the game, etc.

Thumbnails 760a-e may be displayed in response to a user input in some embodiments. For example, thumbnails 760a-e may be displayed in response to a touch input on the display device. As another example, thumbnails 760a-e may be displayed in response to the user double-tapping a "home" button on the display device. In another embodiment, thumbnails 760a-e may be provided for display in a tray on the display device. For example, thumbnails 760a-e may be displayed in a tray at the bottom of the display device in a horizontal row. In yet another embodiment, thumbnails 760a-c may be provided for display in a carousel of thumbnails on the display device.

The social TV app allows the user to comment on more than one show at a time in an embodiment. In some embodiments, the social TV app retains context about all shows being watched and allows the user to still comment on a show he just switched away from. For example, if the user switched from watching "In the City" to "The Track," the user may still comment on "In the City." In that example, the social TV app may provide an entry area for display on the display device that is operable to allow the user to generate a comment on the media content previously viewed while the user is currently watching a different media content.

In some embodiments, the social TV app may determine if a program is over. For example, many programs, such as sporting events, may run longer than their allotted time slot. When this occurs, certain embodiments of the social TV app may ask the user for confirmation that the program is over. For example, the methods described in reference to FIGS. 13-14 and the associated text of U.S. patent application Ser. No. 13/602,011, which is herein incorporated by reference as an example and not by way of limitation, may be used to determine if the show is over.

Figure 8:
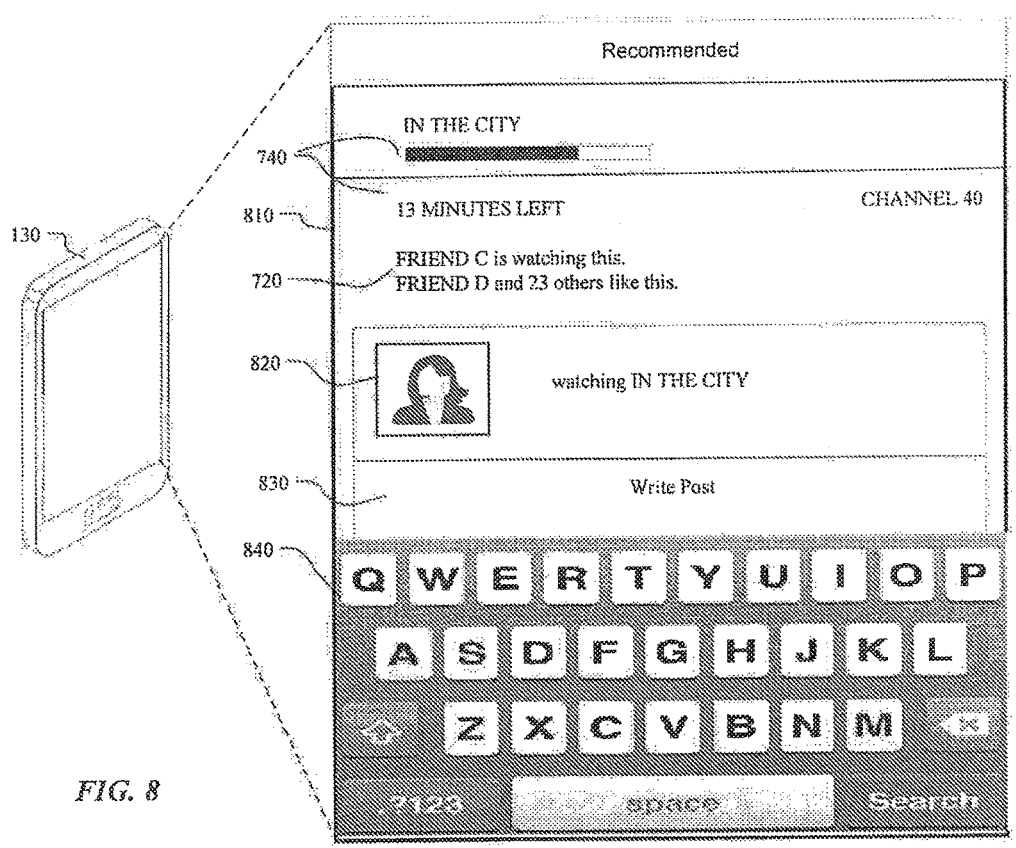
FIG. 8 illustrates a second example embodiment of a show page.

FIG. 8 illustrates a second example embodiment of show page 810. Show page 810 may include social content 720, visual indicator 740, message indication 820, comment area 830, and keyboard 840. Social content 720 and visual indicator 740 may operate as described above in FIG. 7. Generally, show page 810 provides a real-time indication of who is currently watching the particular show. This allows the user to interact with others while watching the show (e.g., chatting, etc.).

Message indication 820 may be displayed with show page 810 in an embodiment. Message indication 820 may provide an indication that the users who are currently watching the show are messageable in certain embodiments. For example, message indication 820 may display another user's profile picture along with a text-entry box, such as comment area 830, that allows the user to type a message that is sent to the other user. In other embodiments, show page 810 may display who has watched the show in the past and if they are messageable.

Comment area 830 may be displayed with show page 810 in particular embodiments. Comment area 830 may allow a user to post a comment about a show or message another user that is currently watching the show. For example, a user may type a message to another user in comment area 830 using keyboard 840.

Figure 9:
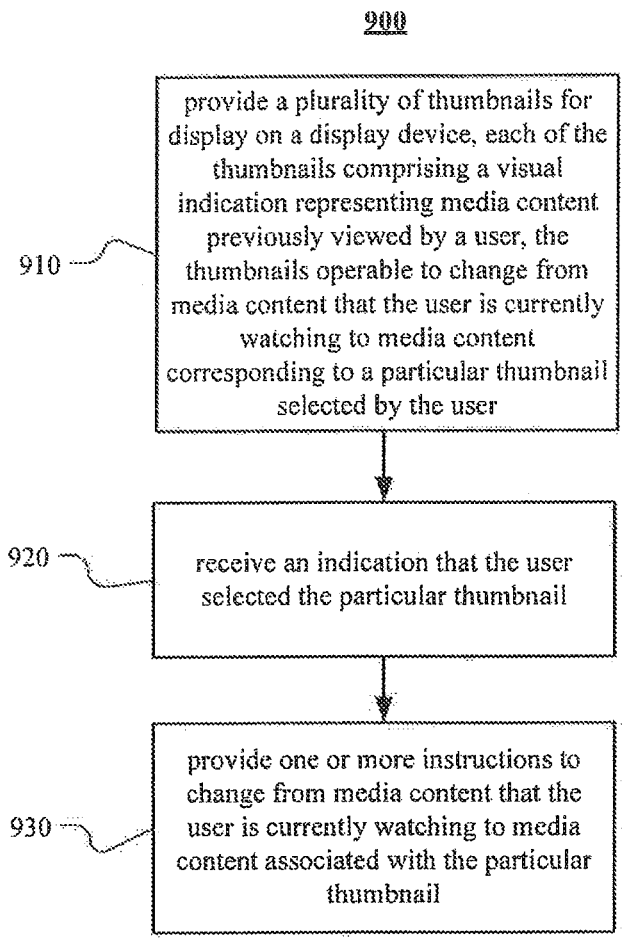
FIG. 9 is a flowchart illustrating an example method for fast switching between programs.

FIG. 9 is a flowchart illustrating an example method 900 for fast switching between programs. Method 900 begins at step 910, where a plurality of thumbnails are provided for display on a display device. In some embodiments, the thumbnails are operable to change from media content that the user is currently watching to media content that the user previously viewed (e.g., the previously-viewed media content that corresponds to the particular thumbnail that the user selected). The plurality of thumbnails may be thumbnails 760a-e in some embodiments. In an embodiment, each of the thumbnails includes a visual indication representing media content previously viewed by a user. The visual indication includes information associated with the media content that the user previously viewed in certain embodiments. For example, the information may be a score of a game or a logo associated with a program.

In step 920, an indication that the user selected the particular thumbnail is received. For example, the social TV app or social-networking system 160 may receive an indication that the user selected thumbnail 760b corresponding to the program "Take a Chance."

In step 930, one or more instructions to change from media content that the user is currently watching to the media content that the user previously viewed (e.g., the previously-viewed media content associated with the particular thumbnail that the user selected) are provided. For example, the social TV app may provide an instruction to a STB to change from "In the City" to "Take a Chance" after the user selected the thumbnail associated with "Take a Chance."

As an example embodiment of operation, a plurality of thumbnails may be displayed on a display device of the user. Each of the thumbnails may correspond to a program that the user previously watched and may be operable to change to that program from a program that the user is currently watching. Once the user selects a particular thumbnail, the social TV app or social-networking system 160 may receive an indication that the user selected the thumbnail. The social TV app may then switch from the program the user is currently watching to the program corresponding to the selected thumbnail. In this manner, the user can quickly switch between programs that the user previously watched.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
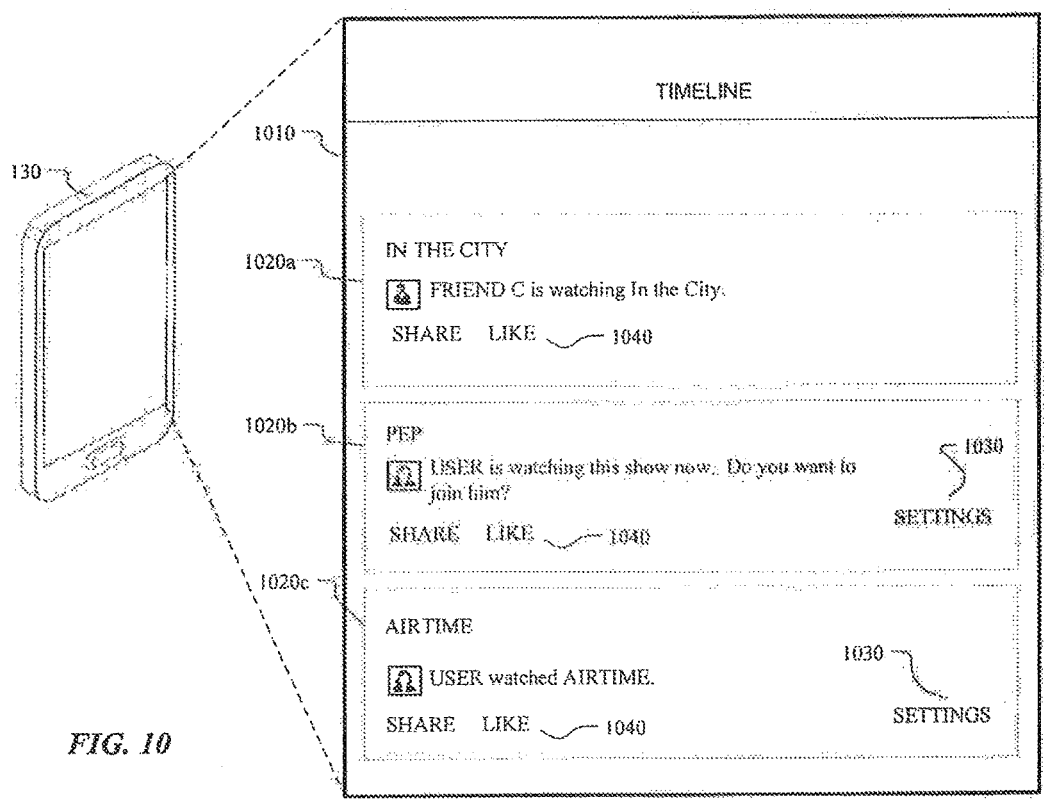
FIG. 10 illustrates an example timeline with example stories indicating that a user watched a program.

FIG. 10 illustrates an example timeline with example stories indicating that a user watched a program. In some embodiments, the social TV app does not immediately publish story 1020 indicating that a user watched or is watching a program. In other embodiments, the social TV app may publish when a user starts watching a program to the user's timeline 1010, subject to the user's privacy settings. In an embodiment, an open graph (OG) action may be published (per user privacy settings) when a user starts watching a show. Publishing may refer to posting to the user's timeline 1010 or advertising to the user's friends (e.g., "User is watching this show now. Do you want to join him?") in an embodiment. For example, story 1020c indicating that "User watched Airtime" may be published a predetermined period of time after the user begins watching Airtime. Story 1020 may include settings 1030 and social content 1040.

Settings button 1030 may be displayed with story 1020 in an embodiment. Settings button 1030 may be an interactive button operable to change options or privacy settings for publishing in certain embodiments. Settings button 1030 may be operable to remove a publication that the user does not want displayed to other users in some embodiments. For example, after story 1020c published, the user may touch interactive settings button 1030 to change publication settings, including removing story 1020c.

Social content 1040 may be displayed with story 1020 in an embodiment. Social content 1040 may include interactive buttons operable to "Share" a publication or "Like" a publication. For example, a user may share that the user is currently watching the program "Pep" by clicking the "Share." As another example, the user may indicate that the user likes that Friend C is watching the program "In the City" by clicking the "Like" button associated with story 1020a.

The social TV app does not immediately publish that the user is watching a program as soon as the user selects the program to watch in certain embodiments. In some embodiments, the social TV app employs time-delayed publishing. After a user switches to a program, the social TV app may log that the user selected the program to watch and then start a count-down timer in an embodiment. Once the timer reaches zero, the social TV app may publish that the user is watching the program, subject to the user's privacy settings. For example, if the user watched "Airtime" for more than a predetermined period of time, then story 1020c may be published indicating that the user watched "Airtime." However, if the user quickly clicked away, then story 1020c may not be published in certain embodiments. In some embodiments, a window of time is given so that the user can change options or privacy settings for publishing that they are watching (or have watched) a program. For example, story 1020c may include settings button 1030, which may be operable to allow the user to change options or privacy settings for publishing that the user is watching or has watched "Airtime." In that example, if story 1020c has already published, the user may altogether remove story 1020c.

In some embodiments, the social TV app will always publish, but will publish with "only-me" privacy unless "shared." in other words, the only user that will see the publication is the user that watched the program. However, if the user "shares" the publication, such as by touching a "Share" button, then the publication will be published so that other users (e.g., the user's friends) of the social TV app may see the publication.

Social TV app may utilize logic to determine intentional versus nonintentional watches. In an embodiment, if a user starts watching a program and then clicks away quickly (e.g., within a predetermined amount of time, such as ten seconds), the social TV app may infer that the user made a mistake. In that embodiment, the social TV app may not publish that the user watched or is watching the program. For example, if the user was quickly changing through channels and stopped on "Airtime" for a few seconds, but then switched channels to "Pep," the social TV app would determine that the user did not intend to watch "Airtime." In that example, the social TV app would not publish story 1020c. Social TV app may utilize a mistake timeout that is smaller than the publish timeout in certain embodiments. For example, if the publish timeout is thirty seconds, then the mistake timeout may be ten seconds. When the mistake timeout is smaller than the publish timeout, nonintentional watches are prevented from publishing. Although particular mistake and publish timeouts were mentioned above, any suitable timeout periods may be used.

Figure 11:
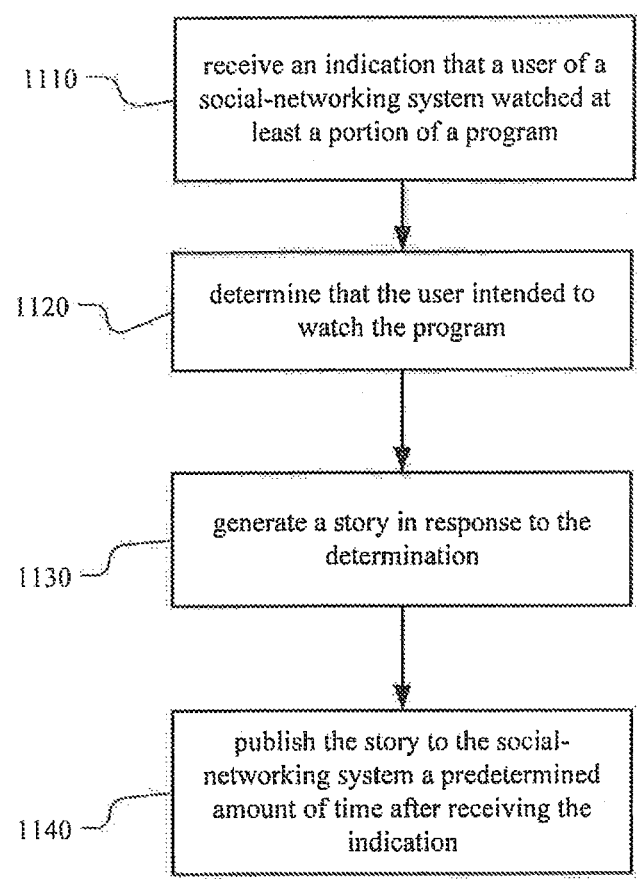
FIG. 11 is a flow chart illustrating an example method for time-delayed publishing.

FIG. 11 is a flow chart illustrating an example method 1100 for time-delayed publishing. Method 1100 may begin at step 1110, where an indication that a user of a social-networking system watched at least a portion of a program is received. For example, the social TV app or social-networking system 160 may receive an indication that a user watched at least a portion of the program "Airtime."

In step 1120, a determination that the user intended to watch the program is made. In an embodiment, step 1120 includes starting a timer in response to receiving the indication in step 1110 and inferring that the user intended to watch the program when an amount of time on the timer equals or exceeds a predetermined amount of time. For example, if the user watches a particular channel for more than fifteen seconds, then the social TV app may infer that the user intended to watch that channel. However, if the user quickly changed the channel, such as within three seconds, then the social TV app may infer that the user did not intend to watch the channel. For example, if the user was quickly flipping channels and passed "Airtime" and "In the City,"

then the social TV app may infer that the user did not intend to watch "Airtime" or "In the City."

In step 1130, a story is generated in response to the determination of step 1120. In some embodiments, a story may be a post indicating that the user watched or is currently watching a program. For example, the story may be story 1020c indicating that the "User watched Airtime." In another embodiment, a story may be an advertisement of the program. For example, the story may be story 1020b indicating that the "User is watching this show now. Do you want to join him?" A story may be generated by the social TV app or social-networking system 160 in an embodiment.

In step 1140, the story is published to the social-networking system a predetermined amount of time after receiving the indication in step 1110, subject to the user's privacy settings. In an embodiment, step 1140 includes logging that the user clicked on the show and starting a count-down timer. Once the count-down timer times out (e.g., reaches zero), the social TV app may publish the story. In an embodiment, the predetermined amount of time may be thirty seconds. In other embodiments, the predetermined amount of time may be any suitable time period. However, in certain embodiments, the predetermined amount of time for publication (e.g., the publication timeout) exceeds the predetermined amount of time for determining that the user intended to watch the program (e.g., the mistake timeout).

Method 1100 may additionally include providing an option for display on a display device operable to allow the user to change a privacy setting after a story is published to the social-networking system. For example, the user may be presented with a window of time that allows the user to change options or privacy settings for publication of stories, which may include altogether removing posted stories. Method 1100 may also include removing the published story upon receiving an indication that the user wants the story removed in an embodiment. For example, if the user alters the privacy settings, the published story may be removed.

As an example embodiment of operation, the social TV app or social-networking system may receive an indication that the user watched at least a portion of a program. The social TV app may determine that the user intended to watch the program, such as by measuring how much time the user watched the program and comparing that time against a predetermined threshold amount of time. Once it is determined that the user intended to watch the program, the social TV app or social-networking system may generate a story indicating that the user watched or is watching the program. The social TV app may then publish the story to the social-networking system a predetermined amount of time after receiving the indication that the user watched the program. In this manner, the social TV app may employ time-delayed publication in some embodiments.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 11.

Figure 12:
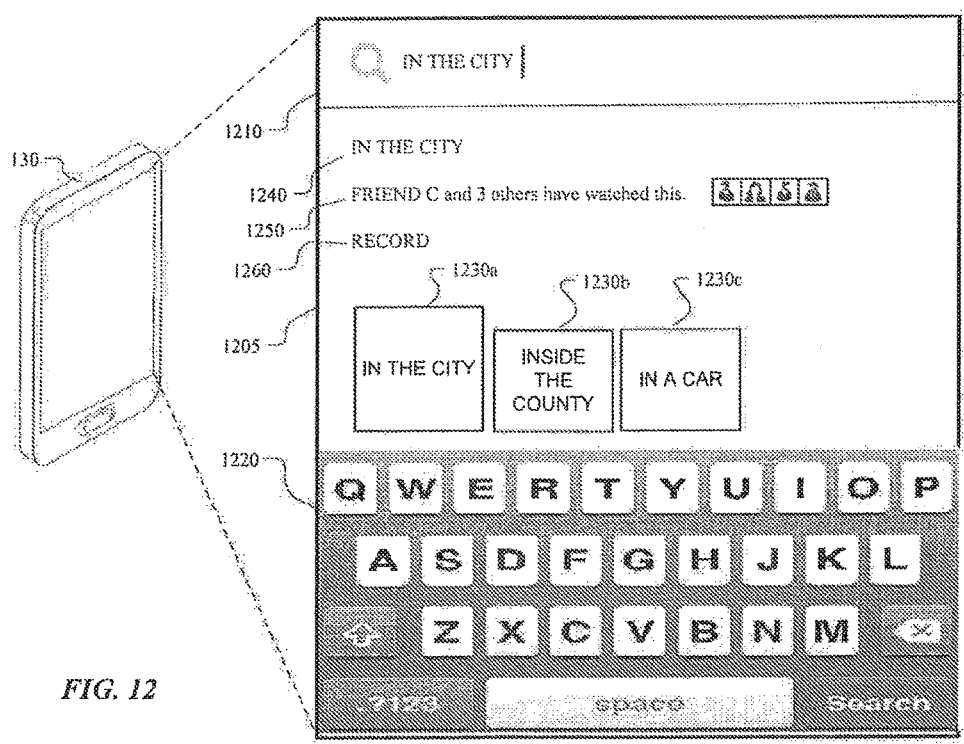
FIG. 12 illustrates an example embodiment of a search tool.

FIG. 12 illustrates an example embodiment of search tool 1205. The social TV app may provide search tool 1205 in certain embodiments. Search tool 1205 provides the user with the ability to search available content to view in some embodiments. Search tool 1205 may include search bar 1210, keyboard 1220, search results 1230, show information 1240, social content 1250, and record button 1260 in an embodiment.

Search bar 1210 may be displayed with search tool 1205 in some embodiments. Search bar 1210 may be any text entry box suitable for entering search queries in an embodiment. A user may search for available media content to view by entering text into search bar 1210 using keyboard 1220 in certain embodiments. For example, if the user wants to search for the program "In the City," the user can type "In the City" and search results 1230 may be displayed. In certain embodiments, the user may search by title, actor, sports team, or any other information. Searches may be conducted on a server of social-networking system 160 for content that will be on in the upcoming weeks in certain embodiments. For example, the user may search for content that will be on in the next two weeks or any other time period. In other embodiments, a search may be conducted for any program in a database, whether it is on in the next few weeks or not. In certain embodiments, a flag may be set to perform some action when the searched program pops up again. The user may select an option to record the show on a DVR in an embodiment. Notifications and reminders may be sent for searched content in some embodiments.

Search results 1230 may be displayed by search tool 1205 as visual indications associated with the search result in particular embodiments. In an embodiment, each visual indication may be a logo representing the program or text associated with the program. For example, the visual indication corresponding to search result 1230a may be the text "In the City," which is the name of the program. Although search results 1230a-c are displayed in a particular configuration, any particular configuration of search results may be used.

Show information 1240 may be displayed in some embodiments. Show information 1240 may include a title of the show or other details of the show. For example, show information 1240 may include details regarding the particular program, such as what "In the City" is about.

Social content 1250 may be displayed in some embodiments. Social content 1250 may include a number of other users that have watched the program. Social content 1250 may also display each user that has watched the program. For example, social content 1250 may display the users in a facepile.

Record button 1260 may be displayed in certain embodiments. Record button 1260 is generally an interactive button that allows the user to record a program, such as on a DVR in some embodiments. For example, the social TV app may display record button 1260 along with a particular search result that allows the user to select record button 1260 to record the program associated with the particular search result, such as "In the City."

Figure 13:
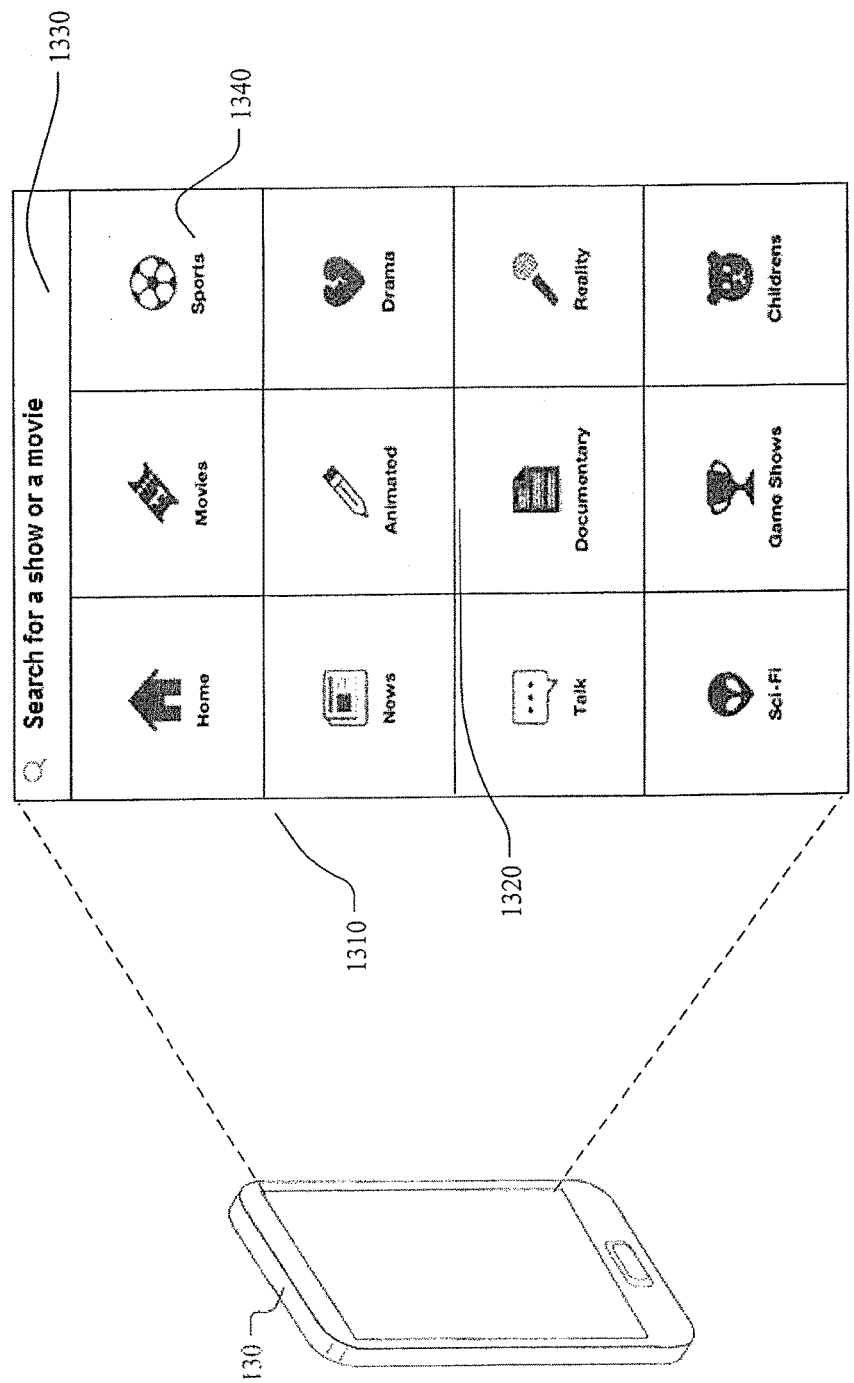
FIG. 13 illustrates an example embodiment of a filter tool.

FIG. 13 illustrates an example embodiment of filter tool 1310. The social TV app may provide filter tool 1310 in some embodiments. Filter tool 1310 may provide the user with the ability to filter the recommended show feed in certain embodiments. Certain embodiments may provide the user with a drop-down list, a genre filter, and/or a search bar. In an embodiment, filter tool 1310 includes genre filter grid 1320 and search bar 1330.

Genre filter grid 1320 allows the user to filer the recommended show feed according to a particular genre in an embodiment. Genre filter grid 1320 may provide the user with a plurality of interactive genre buttons 1340 in certain embodiments. Each of interactive genre buttons 1340 may be operable to filter the recommended show feed according to the genre corresponding to the selected button. For example, if the user only wants sports programming to appear on the recommended show feed, the user may select interactive genre button 1340 corresponding to sports. Although interactive genre buttons 1340 are shown with certain genres, any genres may be used in genre filter grid 1320.

Filter tool 1320 may include search bar 1330 in an embodiment. Search bar 1330 may allow the user to search for media content by title, actor, sports team, or any other information as described above in reference to FIG. 13.

Figure 14:
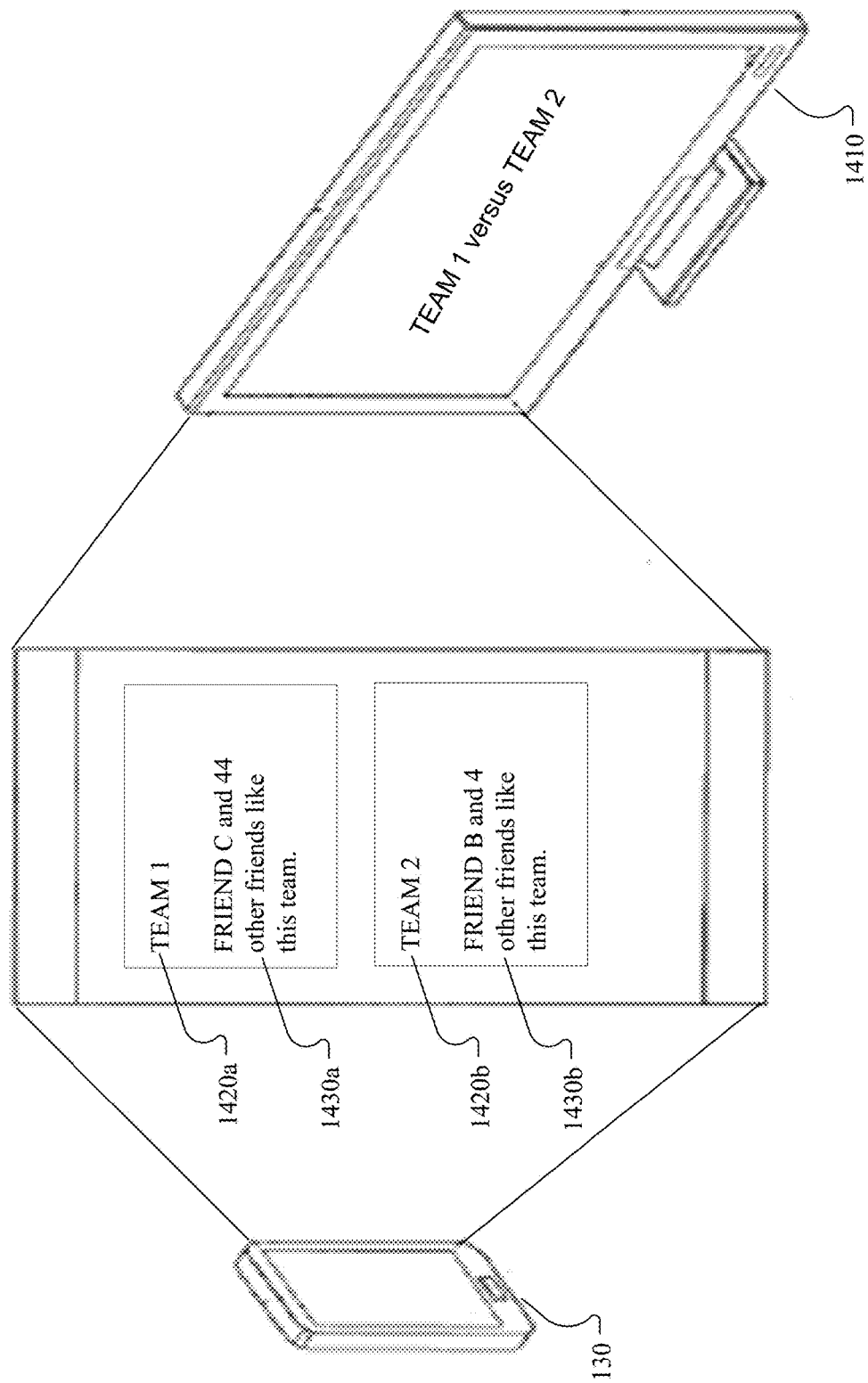
FIG. 14 illustrates example entity information, which may be displayed on a client device or a television.

FIG. 14 illustrates example entity information 1420, which may be displayed on client device 130 or television 1410. In general, the social TV app may display additional information for media content with multiple entities. For example, some programs may include multiple physical entities. Examples of shows with multiple physical entities include sporting events (e.g., two teams), game shows (e.g., final four contestants on a reality show), politics (e.g., two people running for office), and cooking competitions (e.g., two competing chefs). For programs with multiple entities, the social TV app may display entity information 1420 for each entity.

Entity information 1420 may include a name of the entity (e.g., a team name, a contestant name, etc.) in certain embodiments. In other embodiments, entity information 1420 may include a profile image, a photo or a logo associated with the entity. For example, if Team 1 is playing Team 2 shown on television 1410, social TV app may display entity information 1420*a* as "Team 1" and entity information 1420*b* as "Team 2." Alternatively, the social TV app may display logos associated with Team 1 and Team 2 as entity information 1420*a* and 1420*b*, respectively, as another example. As yet another example, the social TV app may provide photos of the final four contestants on a game show.

In an embodiment, the social TV app may differentiate between social context, such as by displaying social content 1430 associated with each entity. For example, the social TV app may display social content 1430*a* associated with Team 1 and social content 1430*b* associated with Team 2. Social content 1430 may indicate a number of friends that are fans of each particular entity. For example, social content 1430*a* may indicate that forty-five friends are fans of Team 1 while social content 1430*b* may indicate that five friends are fans of Team 1. In an embodiment, entity information 1420 and social content 1430 may be displayed on the recommendations feed on client device 130. In other embodiments, entity information 1420 and social content 1430 may be overlaid on television 1410 (e.g., over the displayed media content) or any other display device.

For programs having multiple physical entities, an MSO may provide the names of the entities in an embodiment. For example, the MSO may have a database indicating the names of the various entities involved in a particular program, such as the names of teams participating in a game (e.g., Team 1 and Team 2 in FIG. 14). In some embodiments, the social TV app may access the entity information from the MSO. For example, the social TV app may access MSO data that is stored in a database. As another example, the social TV app may access MSO data that is stored in multiple databases (e.g., programs database, incremental updates database, list of MSO head ends (by zip) database, database that lists linkage between programs and head ends, etc.).

Figure 15:
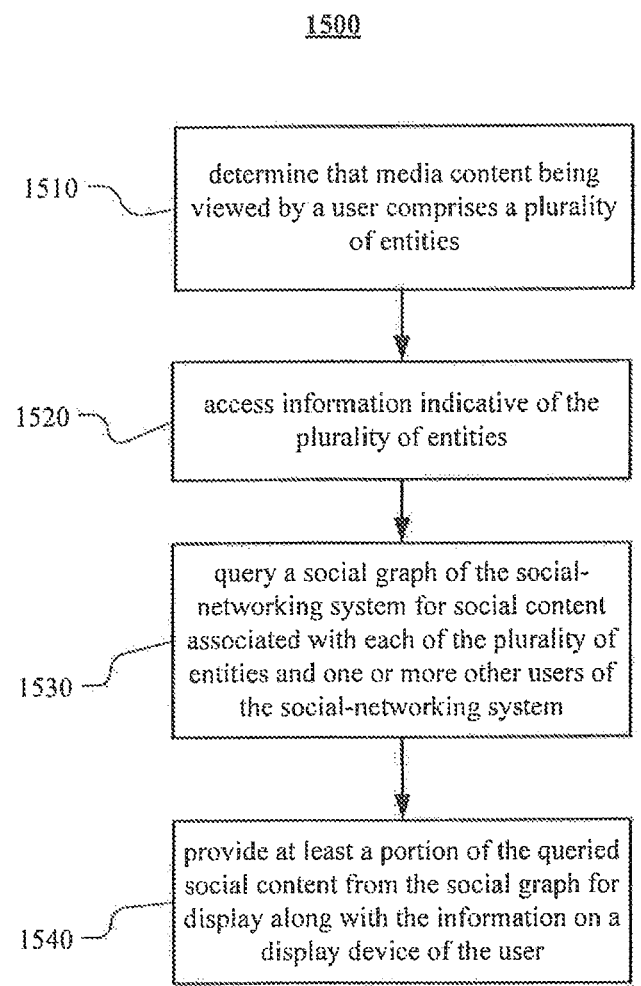
FIG. 15 is a flow chart illustrating an example method for linking multiple entities associated with media content.

FIG. 15 is a flow chart illustrating an example method 1500 for linking multiple entities associated with media content. Method 1500 may begin at step 1510, where it is determined that media content being viewed by a user comprises a plurality of entities. Step 1510 includes, in an embodiment, determining that an MSO provided information indicating that the media content includes a plurality of entities. For example, the social TV app may access an MSO database to determine that multiple entities are involved, such as when two teams are playing a game.

In step 1520, information indicative of the plurality of entities is accessed. The social TV app may access entity information in at least one MSO database, which may have information indicating the names of the entities, a photo of each entity, or a logo of each entity in certain embodiments. In an embodiment, MSO databases may include a programs database, incremental updates database, a list of MSO head ends (by zip) database, a database that lists linkage between programs and head ends, or any other MSO database that may include entity information. In another embodiment, the social TV app may itself have entity information, such as photos of the final four contestants of a game show.

In step 1530, a social graph of the social-networking system is queried for social content associated with each of the plurality of entities and one or more users of the social-networking system in certain embodiments. In some embodiments, the social graph is social graph 200 and includes a plurality of nodes and edges connecting the nodes, the nodes comprising user nodes that are each associated with a particular user of the social-networking system.

In step 1540, at least a portion of the queried social content from the social graph is provided for display along with the information indicative of the entities on the display device. In some embodiments, the social content includes a number of other users of the social-networking system who have "liked" one of the entities. In an embodiment, the entity information and the social content is provided for display in the recommendations feed on a display device of the user. The entity information and the social content may be displayed on client system 130 in an embodiment. In other embodiments, the entity information and the social content is overlaid on television 1410, such as on top of the media content that the entities appear in.

As an example embodiment of operation, media content being viewed by a user is determined to have multiple entities, such as a sports game with multiple teams. The social TV app or social-networking system may access information indicative of the teams, such as by accessing an MSO database. The social TV app or social-networking system may query a social graph for social content associated with the teams, such as how many users "like" each team. The entity information, such as the name of the teams or a logo of each team, may then be displayed on a display device along with the social content. In this manner, a user may quickly see what entities are involved along with related social content.

Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

Figure 16:
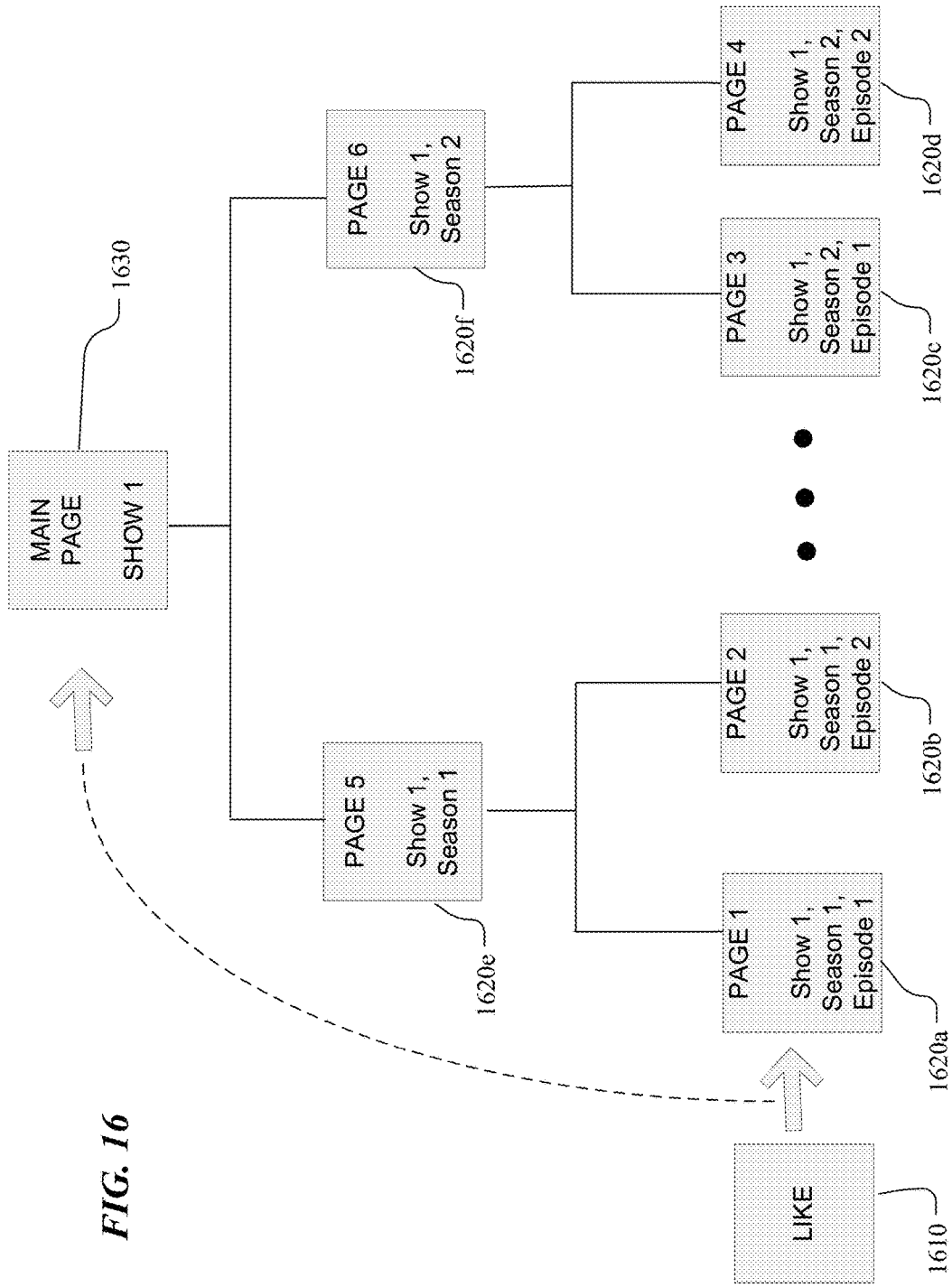
FIG. 16 is an example chart illustrating the aggregation of "likes" to a main page.

FIG. 16 is an example chart illustrating the aggregation of "likes" to a main page. In some embodiments, the social TV app or social-networking system 160 may aggregate user "likes" of pages associated with multiple versions of media content to a main page associated with the content. In an embodiment, "like" 1610 may be an indication that the user likes the media content. In some embodiments, a user may click on or touch a "like" icon of a page associated with media content on a display device.

Page 1620 may be any page associated with a particular version of media content. For example, a page may include a webpage or a profile page. Some media content has multiple versions each having an associated page 1620. For example, multiple versions may include an episode, a season, a series, a movie, or any other version. As an example, as shown in FIG. 16, show 1 may have multiple versions of content, such as multiple episodes and multiple seasons. Each episode may be associated with a page, such as pages 1620a-d. Additionally, each season may be associated with a page, such as pages 1620e-f. Show 1 may also have main page 1630 that is associated with all versions of the content of show 1.

Main page 1630 may be the most-liked page (e.g., the page with the most user "likes") associated with the content in some embodiments. For example, if there are ten pages associated with show 1, and one page has fifty "likes" more than any other page, that page may be determined to be main page 1630. In another embodiment, main page 1630 may be a Wikipedia page for the media content. In that embodiment, the Wikipedia page may be set as main page 1630 when the main page cannot otherwise be determined, such as by analyzing how many "likes" the various pages associated with the media content have.

Once a user "likes" 1610 a page associated with a particular version of show 1, such as page 1620a associated with episode 1, then the social TV app or social-networking system 160 may aggregate the user's "like" 1610 of page 1620a to main page 1630. Additionally, all "likes" for any of the pages 1620a-f associated with any of the episodes or seasons of show 1 may be aggregated to main page 1630. In an embodiment, aggregating a user's "likes" of pages to a main page includes applying the user's "likes" to the main page. For example, if the user "likes" five pages associated with a main page, the social TV app may move those five "likes" to the main page. In another embodiment, aggregating a user's "likes" of pages to a main page includes applying the user's various "likes" of the pages to the main page and removing all of the user's "likes" of all pages except the main page. Thus, aggregating "likes" to a main page moves the user's likes of various other pages to the main page in some embodiments.

In general, some media content may have a character that is associated with multiple versions of the media content. For example, there may be multiple programs related to "Batman" (e.g., multiple movies. TV shows, etc.). When a user "likes" any one of the shows related to "Batman," the "like" may be aggregated to the main page (e.g., the meta-page for "Batman.") in the same manner as above. In an embodiment, media content may include media content from an STB, a DVR, an OTT content provider, or an MSO. In some embodiments, media content may include pay-per-view media content or on-demand media content.

All of the "likes" associated with a particular version of media content are de-duped in some embodiments. In other words, when a user "likes" multiple versions of the same content, a single "like" is applied to the main page of the program in an embodiment. For example, if a user "likes" page 1620a associated with episode 1 of show 1 and also "likes" page 1620e associated with season 1 of show 1, then both of the "likes" may be aggregated into a single "like" for main page 1630 of show 1. In some embodiments, the "likes" of pages other than the main page are removed. For example, the "likes" associated with page 1620a and page 1620e in the last example may be removed.

Figure 17:
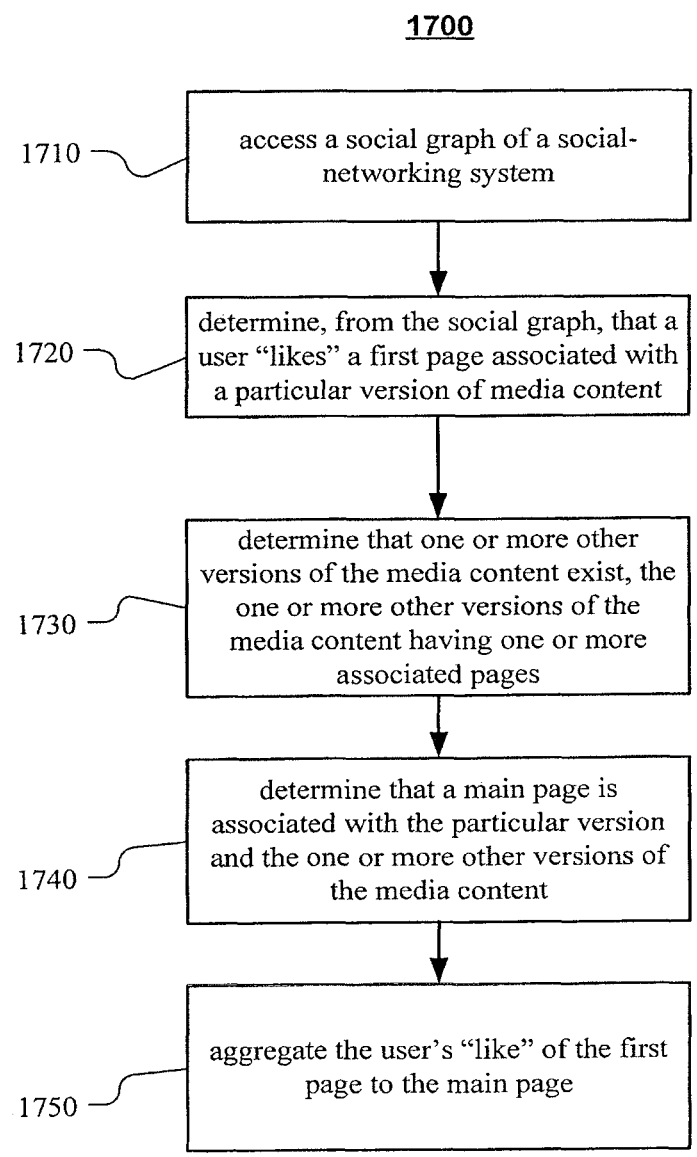
FIG. 17 is a flow chart illustrating an example method for aggregating likes to a main page.

FIG. 17 is a flow chart illustrating an example method 1700 for aggregating "likes" to a main page. Method 1700 may begin at step 1710, where a social graph of a social-networking system is accessed. Social graph may be social graph 200 of social-networking system 160 in an embodiment. Social graph 200 may include a plurality of nodes and edges connecting the nodes in certain embodiments. In some embodiments, the nodes include user nodes that are each associated with a particular user of the social-networking system.

In step 1720, it is determined, from the social graph, that a user "likes" a first page associated with a particular version of media content. Step 1720 may include querying social graph 200 for all of the user's "likes." For example, social TV app may determine that the user has "liked" a page associated with season 1 of show 1, such as page 1620e.

In step 1730, it is determined that one or more other versions of the media content exist. For example, social TV app may determine that there are multiple episodes and seasons of show 1. In an embodiment, some of the one or more versions of media content each have their own page. For example, every episode and season of show 1 may be associated with a page, such as pages 1620a-f.

In step 1740, it is determined that a main page is associated with the particular version of media content that the user "liked" and the one or more other versions of the media content that exist. Step 1740 may include determining a number of "likes" for each page that is associated with the media content. For example, step 1740 may include analyzing how many "likes" pages 1620a-f may have. Step 1740 may additionally include assigning a page having the most "likes" as the main page. For example, if page 1620a has more "likes" than pages 1620b-f, then page 1620a may be assigned as main page 1630. In some embodiments, if a main page cannot be determined, then the Wikipedia page for the media content may be assigned as the main page.

In step 1750, the user's "like" of the first page is aggregated to the main page. For example, the user's "like" 1610 of page 1620a may be aggregated to main page 1630. Additionally, any other "likes" of pages 1620a-f may be aggregated to main page 1630.

Method 1700 may further include determining that the user "likes" more than one page associated with the media content. For example, Method 1700 may determine that the user has "liked" pages 1620a, 1620c, and 1620d. Method 1700 may also include removing all "likes" of the user associated with each page except the main page. In the above example, method 1700 may remove the likes of pages 1620a, 1620c, and 1620d and apply a single "like" to main page 1630.

As an example embodiment of operation, a social graph may be accessed to determine that a user "likes" a first page associated with a particular version of media content, such as "In the City 1." The social TV app may also determine that one or more other versions of the media content exist and each version has an associated page, such as "In the City 2" and "In the City 3", which may each have a corresponding page. The social TV app may determine that a main page is associated with all of the versions of the content, such as a main profile page for "In the City." The social TV app may then aggregate the user's "like" of "In the City 1" to the main profile page for "In the City." In some embodiments, the social TV app may also remove the user's "likes" of "In the City 1."

Particular embodiments may repeat one or more steps of the method of FIG. 17, where appropriate. Although this disclosure describes and illustrates particular steps of the method of FIG. 17 as occurring in a particular order, this disclosure contemplates any suitable steps of the method of FIG. 17 occurring in any suitable order. Moreover, although this disclosure describes and illustrates particular components, devices, or systems carrying out particular steps of the method of FIG. 17, this disclosure contemplates any suitable combination of any suitable components, devices, or systems carrying out any suitable steps of the method of FIG. 17.

In some embodiments, the social TV app may allow live voting for content to be displayed on a TV. For example, in public spaces such as a bar or the airport, users may use the social TV app to vote for what will be shown in the next block of time on a nearby TV. This may allow a show that will be viewed by the most people to be shown on the TV.

In some embodiments, the social TV app provides cross-app linking from newsfeed units and notifications to watch a show. For example, an app of social-networking system 160 or any other third-party app running on client system 130 may be linked to the social TV app. The app may bring up the social TV app (e.g., a show page in the social TV app) and/or send instructions to the social TV app to control a particular STB. Some embodiments may provide a button in the user's newsfeed or a notification to interact with the social TV app to begin watching a show on the user's TV. For example, a post may appear in the user's newsfeed that "Eric just watched 'Gladiator'" along with a button. The user may push the button to watch "Gladiator" on any available service, such as Netflix, Comcast, Hulu, etc. In some embodiments, if a friend watches content on one service (e.g., DirecTV), a button may appear in the social TV app for the user to watch the content on another service (e.g., Netflix). In certain embodiments, a user may invite friends to watch a show with the user (i.e., social push).

In some embodiments, it may be determined where to display a program. For example, if the user's TV is on, the social TV app may control the STB in order to display the program on the TV. In some embodiments, if a TV is not available, the program may be shown in a viewer in a browser or any other available display device.

In certain embodiments, the social TV app determines whether there are multiple owners of a STB. For example, a wife and a husband may both be owners of the STB. In some embodiments, the social TV app permits certain users to have admin permissions for an STB. In some embodiments, the social TV app distinguishes between owners and users. In certain embodiments, all owners are users and have admin rights and the ability to add other users and admins for an STB. In some embodiments, users are permitted to change the channel but nothing else.

In some embodiments, the recommendations for the show feed may change if multiple owners are present. In some embodiments, the recommendations for the show feed may be shared recommendations between all present users. In certain embodiments, the content in the recommendations feed is determined according to the methods described in reference to FIGS. 25 and 26 and in the associated text of U.S. patent application Ser. No. 13/602,011, which is herein incorporated by reference as an example and not by way of limitation. In some embodiments, the social TV app may infer that certain friends are present from messages, Bluetooth, Wi-Fi, and the like. In certain embodiments, the social TV app may determine who is present using the methods described in reference to FIGS. 15-16 and associated text in U.S. patent application Ser. No. 13/602,011, which is herein incorporated by reference as an example and not by way of limitation.

In some embodiments, the social TV app may take action to prevent a user's recommendations from becoming polluted. For example, if a device, such as an iPad, is a shared device, the social TV app may prevent the recommendations for a user of the iPad from polluting the recommendations of another user of the iPad. In another example, the social TV app may prevent recommendations for a user's child from polluting the recommendations for the parent (e.g., if the parent turns on a kid's show for his child, the social TV app may detect this and prevent the kid's shows from polluting the recommendations for the parent). In some embodiments, the social TV app may utilize a camera as a signal to prevent recommendations from becoming polluted.

In some embodiments, the social TV app may auto-detect which STB to control using location information. For example, if a user has multiple STBs in his house, the social TV app may utilize Wi-Fi, Bluetooth, GPS sniffing/correlation, or any other appropriate method to determine the current location of the user in relation to the STBs in the house. In some embodiments, the social TV app may select the nearest STB to the user to control. In some embodiments, the social TV app may prompt the user to go to a room with an STB in order to learn where the STBs are located. In some embodiments, if the location of the user changes, the social TV app may auto switch to the nearest STB. In some embodiments, the social TV app may learn which STB the user wants to control based on previous actions of the user (e.g., when the user is at a certain location, he wants to control a particular STB; when it is a certain time of day, the user wants to control a particular STB, etc.). In some embodiments, determining which STB to control and determining the user's location is subject to user privacy settings.

In some embodiments, the social TV app provides peer-to-peer connectivity for controlling STBs. For example, certain embodiments of the social TV app provide rules for permissions (e.g. a rule could be if friends and friends of friends are local, they are automatically allowed to also control the STB). In some embodiments, STB connectivity information may be passed from one user to another.

In some embodiments, the social TV app may run in the background on client system 130. In some embodiments, when an STB is detected, an icon/subview for the social TV app may appear in a lock-screen of client system 130. For example, an icon may appear in the lock screen of an iPhone that allows the user to launch the social TV app and change the channel on his TV without unlocking his iPhone.

In some embodiments, explicit reminders about a show may be sent to a user. For example, a reminder may be sent to the user when a particular show is about to start. In some embodiments, a button may be presented to the user to automatically start the show on the user's TV. In some embodiments, a reminder is sent to the user when a show begins. In some embodiments, the reminders and notifications may be presented in the user's newsfeed (e.g., in the newsfeed presented in a browser on client system 130, in a newsfeed presented in an app running on client system 1301, in a newsfeed on the user's desktop, etc.). In some embodiments, the reminders and notifications may be sent via email, text messaging, or any other push notification. In some embodiments, the reminders and notifications may be presented on the user's TV screen. In some embodiments, the reminders and notifications may be for any appropriate content. For example, they may be provided when a new season is starting of a show that the user likes, etc.

In some embodiments, media content is aggregated across multiple platforms. For example, if a particular program is available both on Netflix and on cable, a single representation of that program may be presented to the user. In some embodiments, the social TV app or social networking system 160 determines the media content (e.g., entity) that the user wants to watch instead of how (e.g., what channel) the user wants to watch it on. In some embodiments, a central aggregation point is provided that allows the social TV app or social networking system 160 to pull from multiple ways to watch the content. In some embodiments, a canonical representation of all shows in stored in the 00 and the representation is agnostic of the channel of that show. In some embodiments, an action edge in the OG tracks how the content is being watched (e.g., from Hulu, Netflix, cable, etc.). In some embodiments, the recommendations feed includes recommendations for recorded content (e.g., on a DVR), on-demand content, and pay-per-view content, not just channels that are available from the STB.

Figure 18:
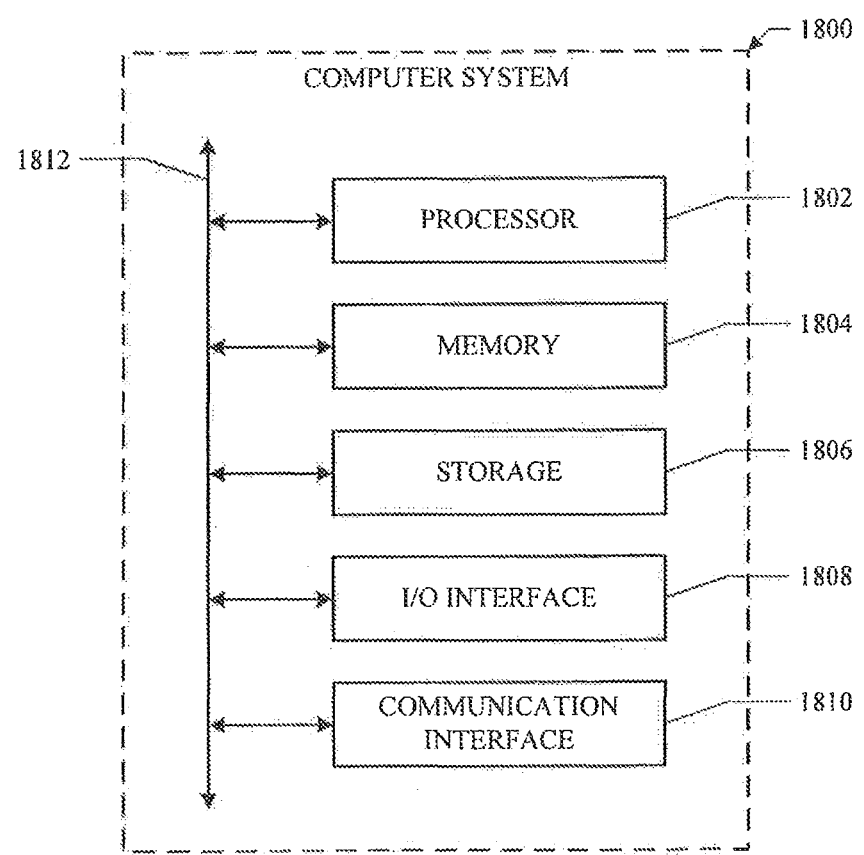
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1800 may include one or more computer systems 1800; he unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor, or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computers, accessing a graph, the graph comprising a plurality of nodes and edges connecting the nodes, the nodes comprising user nodes that are each associated with a particular user;
by the one or more computers, determining, from the graph, that a user "likes" a first page associated with a particular version of a media content;
by the one or more computers, aggregating the user's "like" of the first page to a main page that is associated with the particular version and one or more other versions of the media content;
by the one or more computers, determining that the user "likes" more than one page associated with the media content; and
by the one or more computers, removing all "likes" of the user associated with each page except the main page.

2. The method of claim 1, further comprising, by the one or more computers:
determining a number of "likes" for each of the first page and one or more other pages associated with the media content; and
assigning a page having a highest number of "likes" as the main page.

3. The method of claim 1, wherein the media content comprises one or more of:
media content from a set-top box (STB);
media content from a digital video recorder (DVR);
media content from an over-the-top (OTT) content provider;
media content from a multiple system operator (MSO);
pay-per-view media content; and
on-demand media content.

4. The method of claim 1, wherein the particular version and the one or more other versions of the media content comprise one or more of:
an episode of a show;
a season of the show;
a series of the show; and
a movie.

5. The method of claim 1, wherein the main page is a Wikipedia page associated with the media content.

6. The method of claim 1, wherein the "like" comprises an indication that the user likes the media content.

7. A system comprising:
one or more memory devices; and
a processor communicatively coupled to the one or more memory devices, the processor operable to:
access a graph, the graph comprising a plurality of nodes and edges connecting the nodes, the nodes comprising user nodes that are each associated with a particular user;
determine, from the graph, that a user "likes" a first page associated with a particular version of a media content;
aggregate the user's "like" of the first page to a main page that is associated with the particular version and one or more other versions of the media content;
determine that the user "likes" more than one page associated with the media content; and
remove all "likes" of the user associated with each page except the main page.

8. The system of claim 7, wherein the processor is further operable to:
determine a number of "likes" for each of the first page and one or more other pages associated with the media content; and
assign a page having a highest number of "likes" as the main page.

9. The system of claim 7, wherein the media content comprises one or more of:
media content from a set-top box (STB);
media content from a digital video recorder (DVR);
media content from an over-the-top (OTT) content provider;
media content from a multiple system operator (MSO);
pay-per-view media content; and
on-demand media content.

10. The system of claim 7, wherein the particular version and the one or more other versions of the media content comprise one or more of:
an episode of a show;
a season of the show;
a series of the show; and
a movie.

11. The system of claim 7, wherein the "like" comprises an indication that the user likes the media content.

12. One or more computer-readable non-transitory storage media in one or more computing systems, the media embodying logic that is operable when executed to:
access a graph, the graph comprising a plurality of nodes and edges connecting the nodes, the nodes comprising user nodes that are each associated with a particular user;
determine, from the graph, that a user "likes" a first page associated with a particular version of a media content;
aggregate the user's "like" of the first page to a main page that is associated with the particular version and one or more other versions of the media content;
determine that the user "likes" more than one page associated with the media content; and
remove all "likes" of the user associated with each page except the main page.

13. The media of claim 12, wherein the logic is further operable to:

determine a number of "likes" for each of the first page and one or more other pages associated with the media content; and assign a page having a highest number of "likes" as the main page.

14. The media of claim 12, wherein the media content comprises one or more of:
   media content from a set-top box (STB);
   media content from a digital video recorder (DVR);
   media content from an over-the-top (OTT) content provider;
   media content from a multiple system operator (MSO);
   pay-per-view media content; and
   on-demand media content.

15. The media of claim 12, wherein the particular version and the one or more other versions of the media content comprise one or more of:
   an episode of a show;
   a season of the show;
   a series of the show; and
   a movie.

16. The media of claim 12, wherein the main page is a Wikipedia page associated with the media content.

17. The media of claim 12, wherein the "like" comprises an indication that the user likes the media content.

* * * * *